United States Patent
Ghorpade et al.

(10) Patent No.: US 11,973,823 B1
(45) Date of Patent: Apr. 30, 2024

(54) OFFLOADING NAMESPACE REDIRECTION TO BACKUP CLIENTS IN A SCALE OUT CLUSTER

(71) Applicant: Dell Products L.P., Round Rock, TX (US)

(72) Inventors: Nachiket Vilasrao Ghorpade, Pune (IN); Viral Kirtikumar Mehta, JamKhambhalia (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/153,346

(22) Filed: Jan. 11, 2023

(51) Int. Cl.
*H04L 67/1014* (2022.01)
*H04L 67/1008* (2022.01)
*H04L 67/1097* (2022.01)

(52) U.S. Cl.
CPC ...... *H04L 67/1014* (2013.01); *H04L 67/1008* (2013.01); *H04L 67/1097* (2013.01)

(58) Field of Classification Search
CPC ............. H04L 67/1014; H04L 67/1008; H04L 67/1097
See application file for complete search history.

(56) References Cited

U.S. PATENT DOCUMENTS

| | | | | |
|---|---|---|---|---|
| 7,958,199 B2 * | 6/2011 | Ferrari | ..................... | H04L 67/01 709/219 |
| 10,055,262 B1 * | 8/2018 | Thomas | ................ | G06F 9/5083 |
| 10,223,172 B2 * | 3/2019 | Eda | .......................... | G06F 3/061 |
| 10,225,343 B2 * | 3/2019 | Banerjee | ............. | H04L 67/1097 |
| 10,299,098 B2 * | 5/2019 | Zarakas | ................ | H04L 63/062 |
| 10,979,493 B1 * | 4/2021 | Farrugia | ............... | H04L 47/125 |
| 11,658,812 B1 * | 5/2023 | Chamorro | ............. | H04L 9/0897 380/279 |
| 2002/0154623 A1 * | 10/2002 | Hundemer | ......... | H04N 21/8126 370/352 |
| 2005/0038890 A1 * | 2/2005 | Masuda | .............. | H04L 67/1008 709/224 |
| 2006/0013224 A1 * | 1/2006 | Chiba | ................... | H04L 47/125 370/389 |

(Continued)

FOREIGN PATENT DOCUMENTS

| | | | | |
|---|---|---|---|---|
| CA | 2770789 A1 * | 9/2012 | ......... | H04L 12/2863 |
| CA | 2810823 A1 * | 9/2014 | ............. | F03D 70/47 |

(Continued)

*Primary Examiner* — Shean Tokuta
(74) *Attorney, Agent, or Firm* — Staniford Tomita LLP

(57) ABSTRACT

A load balancing algorithm and cluster configuration details are stored at each of a set of namespace nodes of a cluster hosting a deduplicated file system. Upon a client connecting to a namespace node, a server-initiated communication channel is established between the namespace node and the client over which updates to the load balancing algorithm, cluster configuration details, or both are sent. The load balancing algorithm and cluster configuration details are sent to the client, thereby allowing the client to determine according to the load balancing algorithm and cluster configuration details, which particular namespace node should handle a particular file system operation. Thereafter, each connected client is immediately notified of changes to the cluster such as node or service additions or deletions or software upgrades to the cluster so that each client can use the updated information to conduct load balancing.

15 Claims, 15 Drawing Sheets

(56) References Cited

U.S. PATENT DOCUMENTS

| | | | | |
|---|---|---|---|---|
| 2009/0210431 A1* | 8/2009 | Marinkovic | | G06F 16/1827 709/227 |
| 2010/0333104 A1* | 12/2010 | Unnikrishnan | | G06F 9/505 718/105 |
| 2011/0128972 A1* | 6/2011 | Thornton | | H04L 67/143 370/466 |
| 2011/0138053 A1* | 6/2011 | Khan | | G06F 9/505 709/226 |
| 2011/0154015 A1* | 6/2011 | Rahman | | G06F 21/6209 707/827 |
| 2011/0251992 A1* | 10/2011 | Bethlehem | | H04L 67/141 707/610 |
| 2011/0296051 A1* | 12/2011 | Vange | | H04L 45/00 709/238 |
| 2013/0227100 A1* | 8/2013 | Dobies | | H04L 67/1001 709/223 |
| 2015/0269186 A1* | 9/2015 | Kimball | | G06F 16/1865 709/217 |
| 2016/0050146 A1* | 2/2016 | Henderson | | H04L 67/1097 370/392 |
| 2017/0054796 A1* | 2/2017 | Eda | | H04L 67/565 |
| 2017/0286178 A1* | 10/2017 | Chougule | | G06F 9/505 |
| 2018/0048731 A1* | 2/2018 | Yeager | | H04L 67/568 |
| 2019/0095840 A1* | 3/2019 | Riguera Arias | | G06F 16/211 |
| 2019/0238627 A1* | 8/2019 | Shiell | | H04L 67/141 |
| 2019/0243702 A1* | 8/2019 | Shilane | | G06F 11/0709 |
| 2021/0136144 A1* | 5/2021 | Varanasi | | H04L 67/01 |
| 2021/0337045 A1* | 10/2021 | Li | | H04L 67/10 |
| 2023/0020458 A1* | 1/2023 | Chaudhary | | G06F 11/1464 |

FOREIGN PATENT DOCUMENTS

| | | | | |
|---|---|---|---|---|
| CN | 100429896 C | * | 10/2008 | |
| CN | 101394313 A | * | 3/2009 | ............ H04L 41/06 |
| CN | 102075445 A | * | 5/2011 | .......... H04L 61/251 |
| CN | 102932185 A | * | 2/2013 | |
| CN | 108696551 A | * | 10/2018 | |
| CN | 110365723 A | * | 10/2019 | ........ H04L 45/7453 |
| CN | 110377327 A | * | 10/2019 | ............. G06F 8/71 |
| CN | 114625826 A | * | 6/2022 | |
| CN | 115964136 A | * | 4/2023 | |
| EP | 3334119 A1 | * | 6/2018 | ........... H04L 45/304 |
| EP | 3113449 B1 | * | 9/2020 | ......... H04L 67/1034 |
| JP | 2005092862 A | * | 4/2005 | ............ H04L 29/06 |
| KR | 100650003 B1 | * | 11/2006 | |
| WO | WO-2004088931 A1 | * | 10/2004 | ............ H04L 12/28 |
| WO | WO-2011006834 A1 | * | 1/2011 | ........ H04L 65/4092 |
| WO | WO-2019001092 A1 | * | 1/2019 | ............ H04L 29/06 |

\* cited by examiner

```
┌─────────────────────────────────────────────────────────────┐
│ Store, at each of a set of namespace nodes in a cluster      │
│ hosting a deduplicated file system, a load balancing         │
│ algorithm and cluster configuration details                  │
│ 510                                                          │
└─────────────────────────────────────────────────────────────┘
                              │
                              ▼
┌─────────────────────────────────────────────────────────────┐
│ Upon a client of the cluster connecting to a namespace node,│
│ establish a server-initiated communication channel between   │
│ the client and namespace node to allow the namespace node to│
│ send to the client updates to the load balancing algorithm  │
│ and cluster configuration details                           │
│ 515                                                          │
└─────────────────────────────────────────────────────────────┘
                              │
                              ▼
┌─────────────────────────────────────────────────────────────┐
│ Send the load balancing algorithm and cluster configuration │
│ details to the client                                        │
│ 520                                                          │
└─────────────────────────────────────────────────────────────┘
                              │
                              ▼
┌─────────────────────────────────────────────────────────────┐
│ Run, at the client, the load balancing algorithm with the   │
│ cluster configuration details to identify a namespace node  │
│ that should handle a file system operation                  │
│ 522                                                          │
└─────────────────────────────────────────────────────────────┘
                              │
                              ▼
┌─────────────────────────────────────────────────────────────┐
│ Assign the file system operation to the identified          │
│ namespace node                                               │
│ 523                                                          │
└─────────────────────────────────────────────────────────────┘
                              │
                              ▼
┌─────────────────────────────────────────────────────────────┐
│ Monitor the cluster for updates to the load balancing       │
│ algorithm, cluster configuration details or both            │
│ 525                                                          │
└─────────────────────────────────────────────────────────────┘
                              │
                              ▼
┌─────────────────────────────────────────────────────────────┐
│ Receive, at each of the set of namespace nodes, updates to  │
│ one or more of the load balancing algorithm or the cluster  │
│ configuration details                                        │
│ 530                                                          │
└─────────────────────────────────────────────────────────────┘
                              │
                              ▼
┌─────────────────────────────────────────────────────────────┐
│ Send, over the server-initiated channel, the updates from   │
│ the namespace node to the client                            │
│ 535                                                          │
└─────────────────────────────────────────────────────────────┘
```

FIG. 5

OFFLOADING NAMESPACE REDIRECTION TO BACKUP CLIENTS IN A SCALE OUT CLUSTER

TECHNICAL FIELD

The present invention relates generally to information processing systems, and more particularly to large scale file systems.

BACKGROUND

A cluster is a group of multiple resources, such as servers, that are combined to work as a single entity. It is desirable that workloads are distributed across the multiple resources of the cluster so that a particular resource is not over-utilized while another resource is under-utilized. Having an imbalance can degrade the performance of the cluster and thus negatively impact clients that may be relying on the cluster.

A conventional approach to handling workload distribution in a cluster is a central load balancer or central proxy redirection service. Load balancers can work with many different protocols. Client requests are directed to the load balancer and the load balancer distributes the requests among the multiple resources of the cluster. Such an approach, however, has drawbacks especially when used with large scale distributed file systems. For example, there is a need to develop, manage, and scale the load balancer or load balancing instances. As another example, a client request must first be routed to the load balancer and then to a particular cluster resource, thereby incurring a hop between the client and load balancer. In large distributed file systems, it is difficult to extend to granular approaches where a single file may be distributed across multiple nodes.

Therefore, there is a need for improved systems and techniques to handle distribution of workload in a cluster hosting a large distributed file system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 5 shows an overall flow for offloading redirection to a client, according to one or more embodiments.

DETAILED DESCRIPTION

Figure 1:
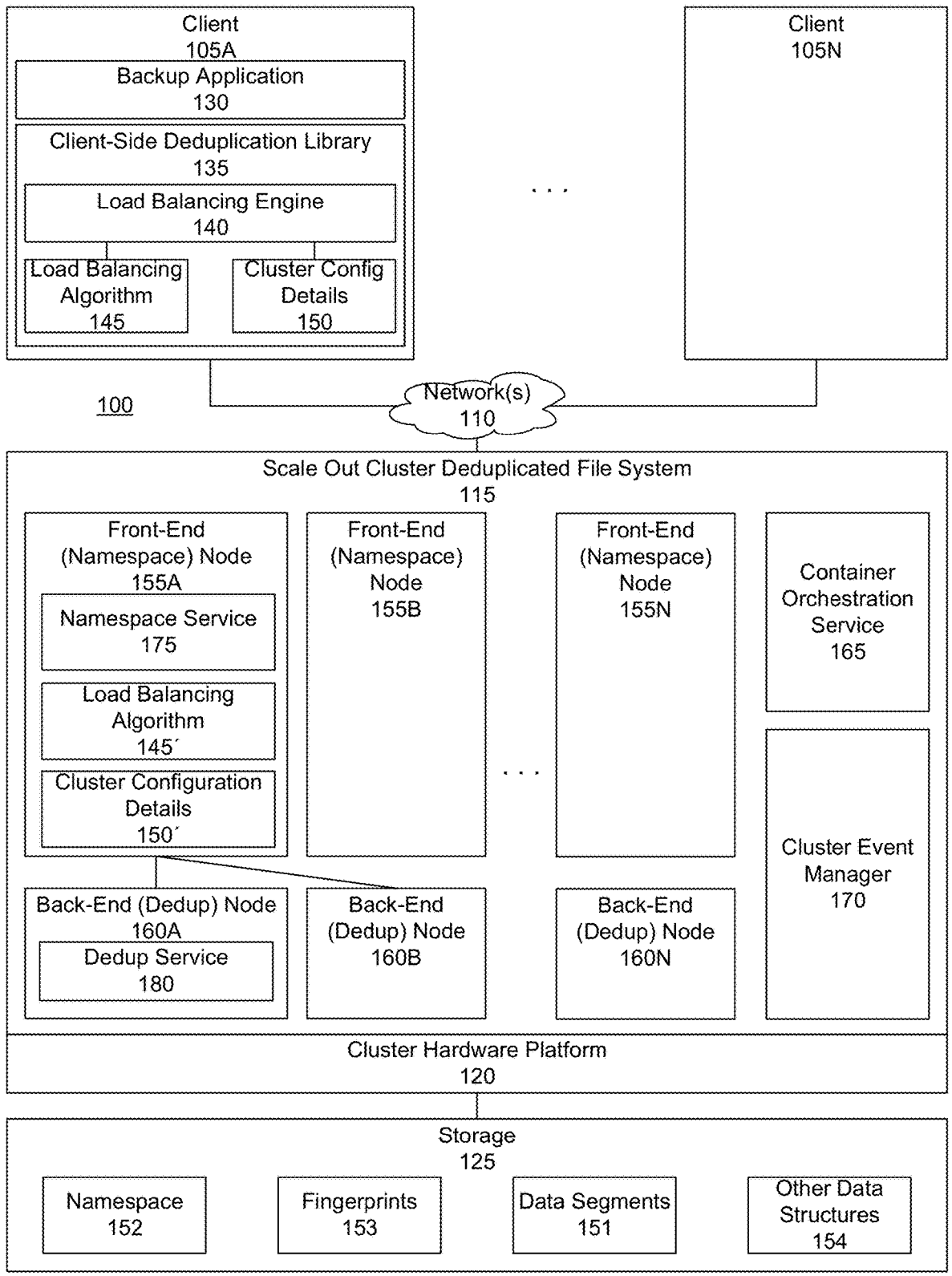
FIG. 1 shows a block diagram of an information processing system having a scale out cluster deduplicated file system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a simplified block diagram of an information processing system 100 within which methods and systems for offloading namespace redirection to backup clients in a scale out cluster may be implemented. The example shown in FIG. 1 includes a set of clients 105A-N connected via a network 110 to a file system 115. The file system is hosted by an underlying hardware platform 120 which, in turn, is connected to a storage system 125.

Installed at each client is a backup application 130 and client-side deduplication library 135. The client-side deduplication library includes a load balancing engine 140, load balancing algorithm 145, and cluster configuration details 150. In an embodiment, when the backup application seeks to perform a file system operation, the backup application issues a call (e.g., application programming interface (API) call) to the client library to request the file system operation. The load balancing engine runs the load balancing algorithm, which takes as input the cluster configuration details, to determine or identify what particular front-end node of the file system cluster should be sent the file system operation request. The client library then issues a corresponding remote procedure call (RPC) for the file system operation request to the identified front-end node. Front-end nodes are responsible for handling namespace operations including file operations, directory operations, open operations, close operations, access operations, lookup operations, and the like. The clients themselves are responsible for load balancing or distributing their requests across the front-end nodes of the cluster. This architectural design eliminates the need for a separate central load balancer or separate redirection proxy and thus problems such as additional hops that are required with having a load balancer or separate proxy service.

An example of a client-side deduplication library is Data Domain Boost (DDBoost) as provided by Dell Technologies of Round Rock, Texas. Some embodiments are described in conjunction with the DDBoost protocol, Data Domain Restorer (DDR) storage system, and Data Domain file system as provided by Dell Technologies. It should be appreciated, however, that principles and aspects discussed can be applied to other file systems, file system protocols, and backup storage systems.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage includes, in addition to user data segments 151, other data structures storing metadata to facilitate access to the data via file system protocols, scaling of the file system, and deduplication. In particular, storage includes a namespace 152 and fingerprints 153, among other data structures 154. In an embodiment, the namespace is held in a tree structure and, more specifically, a Btree. The fingerprints correspond to unique hash values calculated from the data segments and may be stored in a fingerprint index. Further discussion is provided below.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the file system provides a backup target for data generated by the clients. In an embodiment, the file system is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

The file system provides a way to organize data stored in a storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the file system is a deduplicated distributed file system. The file system includes a set of front-end nodes or services 155A-N, a set of back-end nodes or services 160A-N, a container orchestration service 165, and a cluster event manager 170. Specifically, the front-end nodes host front-end services 175 for handling namespace operations and file access requests including file and folder creation and deletion, and random input/output (IO) reads and writes. As such, the front-end nodes may be referred to as namespace nodes. In an embodiment, namespace nodes are cluster nodes or a microservice that collectively hosts cluster wide namespace. A namespace service refers to a service responsible for managing namespace across the cluster.

The back-end nodes host back-end services for handling deduplication 180. As such, the back-end nodes may be referred to as deduplication or dedup nodes. In an embodiment, dedup nodes are cluster nodes or a microservice that collectively hosts the backup data. A node of a cluster may be a container, server, or virtual server.

In an embodiment, the file system is implemented as a set of microservices (e.g., front-end microservices and back-end microservices) running as containers. The file system uses the underlying storage system for persistence. The container orchestration service is responsible for managing the microservices such as adding a new instance of a front-end service, back-end service, or both to accommodate an increase in demand and thus ensure good performance for clients that may be accessing the file system and requesting file system operations. Alternatively, the orchestration service may remove an existing instance of a front-end service, back-end service, or both to accommodate a decrease in demand and thus reduce costs associated with resources needed to run the services. The number of instances of each microservice can change based on demand. An example of a container orchestration service is Kubernetes. Kubernetes is an open-source container-orchestration system for automating computer application deployment, scaling, and management.

A container is a virtualized computing environment to run an application program as a service or, more specifically, microservice. Thus, in an embodiment, the file system microservices, including namespace and deduplication services, run inside a virtualized environment provided by the orchestration service. The container orchestration layer can run on a single or multiple physical or virtual nodes.

Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

The cluster event manager communicates with the orchestration service for cluster updates and is a service that is responsible for sending events about changes in the cluster such as node addition/deletion or service addition/deletion. In an embodiment, these events detail changes to the cluster and are sent from the cluster event manager to the front-end or namespace nodes which, in turn, forward the cluster change events to the clients. In an embodiment, the event manager is further responsible for sending any updates to the load balancing algorithm to each of front-ends so that the front-ends can forward the updates to each of the clients. The updates to the load balancing algorithm may be provided by an administrator user via a user interface console of the file system or uploaded to the event manager via a configuration file.

In an embodiment, the clients access the file system using a protocol referred to as DDBoost. Thus, the clients may be referred to as DDBoost clients. The clients (e.g., DDBoost clients) connect to the namespace nodes to perform file operations for backup jobs and restore jobs. DDBoost is a system that distributes parts of a deduplication process to the application clients, enabling client-side deduplication for faster, more efficient backup and recovery. In an embodiment, the clients use the DDBoost backup protocol to conduct backups of client data to the storage system, restore the backups from the storage system to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. A client may run any number of different types of protocols as the file system supports multiple network protocols for accessing remote centrally stored data (e.g., Network File System (NFS), Common Internet File System (CIFS), Server Message Block (SMB), and others).

A scale out cluster for the file system may include hundreds or even thousands of nodes/services providing file system namespace to the protocol's clients such as DDBoost clients. It is important for several reasons to distribute client and workload across all the cluster nodes/services. Typically, the distribution of load is handled by a centralized load balancer service or proxy service. However, having a centralized load balancer service or proxy service has certain drawbacks such as managing the service, scaling the service, and other problems. In an embodiment, systems and techniques are provided to achieve load balancing by offloading redirection logic to the client, thereby eliminating the need for a centralized load balancer service or proxy service.

In the scale out cluster environment there are various namespace nodes/services which protocol clients such as a DDBoost client can connect to for namespace operations and data operations as a pass-through. For reasons including locality, performance, and others, it is important to distribute each file operation request to the namespace node/service best suited to handle the request.

In an embodiment, this is achieved by providing protocol clients with an algorithm that should be used for distribution of file operations. The clients are also made aware of the cluster map and number of active nodes and services running and their details such as Internet Protocol (IP) addresses and the client can use that information to distribute load and connect to the namespace node/service best suited for the operation. Thus, the clients are provided with cluster configuration details in addition to the load balancing algorithm.

In an embodiment, systems and techniques are also provided to notify the clients about cluster membership events such as a new node or service being added, or node or service being removed so that the client can update its knowledge about the cluster and change its file distribution logic accordingly. This is achieved by sending namespace node/service change events back to the clients using a server-initiated communication channel mechanism. In an embodiment, the server-initiated channel is a mechanism by which a backup storage system (e.g., DDR) can communicate back remote procedure call (RPC) messages to a DDBoost client, similar to the manner in which the DDBoost client communicates with DDR. The DDBoost server-initiated connection is established during the first connection to the node.

More specifically, as shown in the example of FIG. 1, each front-end node includes most recent versions of load balancing algorithm and cluster configuration details identified as 145' and 150', respectively, that have been provided by the cluster event manager. When an initial connection is established between a front-end node and a client, the front-end node transmits the latest load balancing algorithm and cluster configuration details to the client so that the client can determine to which particular front-end node a file operation request should be directed. In an embodiment, the initial connection is accompanied by forming a server-initiated connection between the front-end node and client over which changes or updates to the load balancing algorithm, cluster configuration details, or both are sent. Since each front-end is supplied with a copy of the load balancing algorithm and cluster configuration details, a client can connect with any front-end to receive the load balancing algorithm and cluster configuration details.

Figure 2:
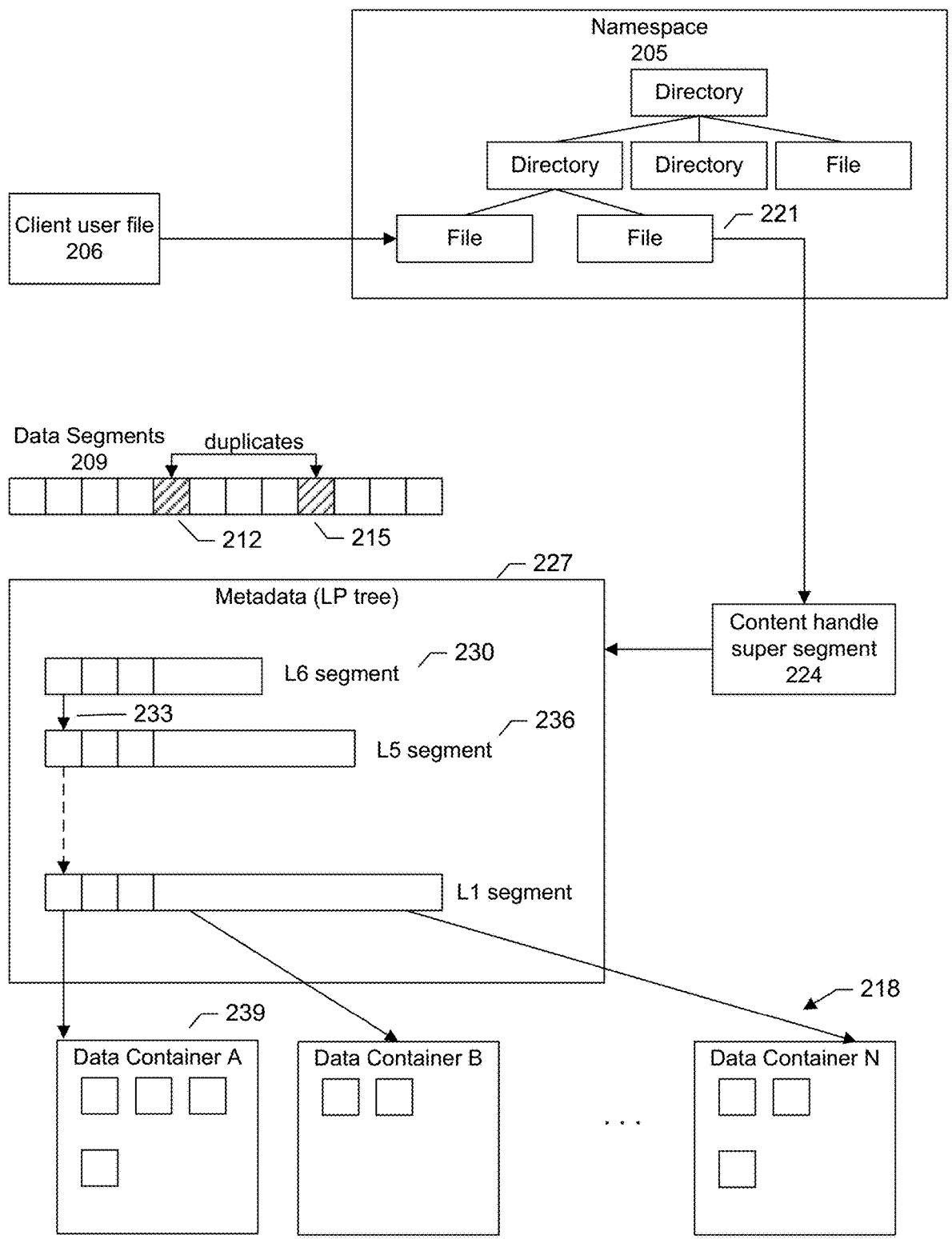
FIG. 2 shows an example of a deduplication process, according to one or more embodiments.

FIG. 2 shows a block diagram illustrating a deduplication process of the file system according to one or more embodiments. A deduplicated file system is a type of file system that can reduce the amount of redundant data that is stored. As shown in the example of FIG. 2, the file system maintains a namespace 205. In an embodiment, each node of a cluster is responsible for a particular portion of the namespace and each node may perform deduplication within its assigned portion of the namespace. Further details of a file system namespace are provided in FIG. 3 and the discussion accompanying FIG. 3.

As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within a shared storage pool. The amount of metadata may range from about 2 or 4 percent the size of the user data.

More specifically, the file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments are stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the file system may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments.

Figure 3:
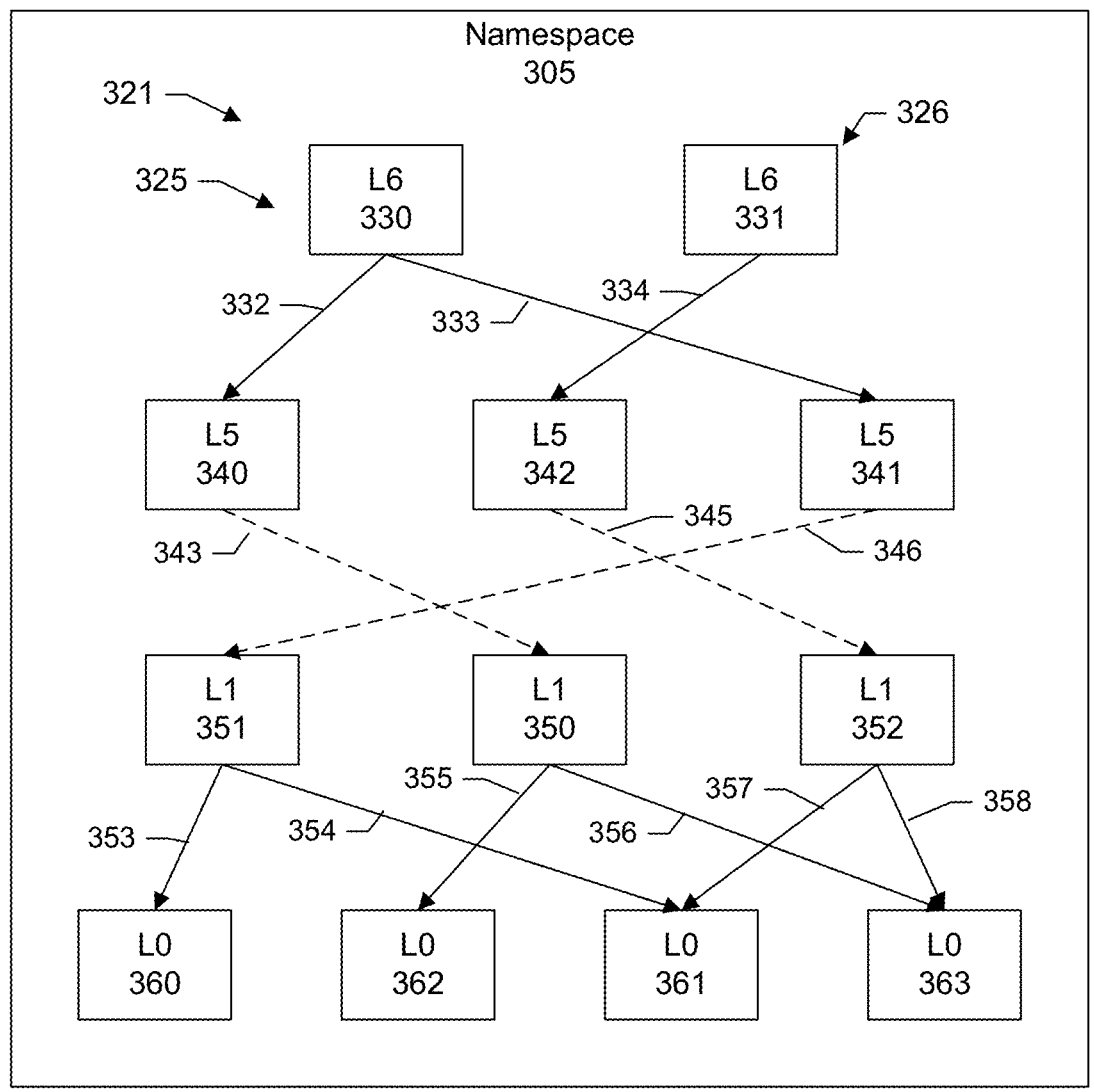
FIG. 3 shows an example of a namespace, according to one or more embodiments.

FIG. 3 shows further detail of a namespace 305 of the file system that may be used to organize the client data stored in the storage. The namespace includes a set of trees 321 where each file in the file system is represented by a tree. A tree includes a set of segment levels arranged in a hierarchy. In a specific embodiment, a tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first tree 325 having an L6 segment 330 and representing a first file. There is a second tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first tree representing a first file. The second upper level segment may be from a second tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, segment 352 as shown by arrows 344, arrow 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Figure 4:
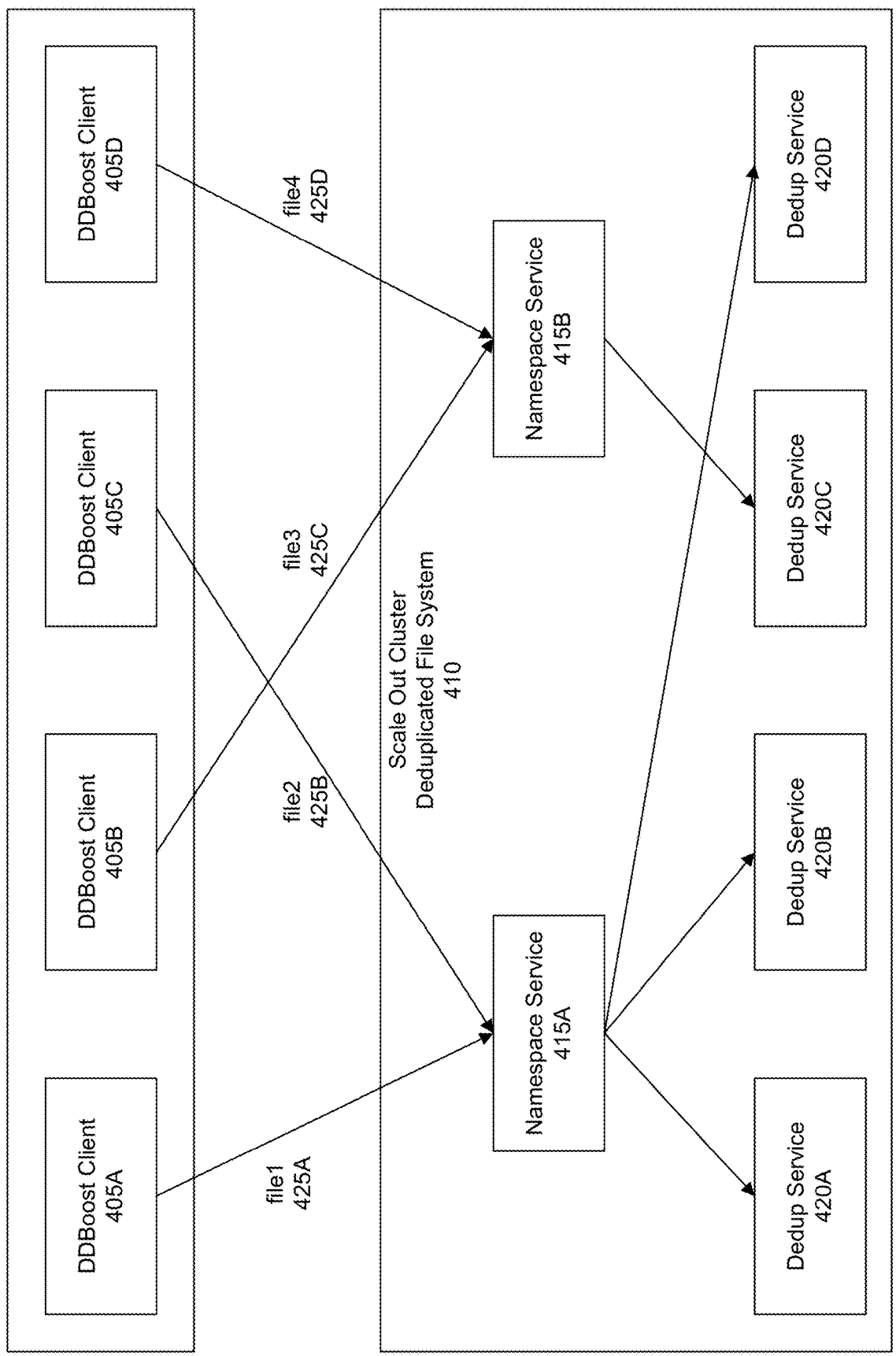
FIG. 4 shows a block diagram of client redirection to an appropriate namespace node, according to one or more embodiments.

FIG. 4 shows a block diagram of connections between clients 405A-D and a scale out file system cluster 410 for file operations. In an embodiment, systems and techniques are provided to offload redirection logic to clients, notify cluster membership changes to clients (e.g., DDBoost clients), and optimize lookups of full path. As shown in the example of FIG. 4, the scale out cluster is shown as having two namespace or front-end nodes running namespace services 415A,B, respectively, and four dedup or back-end nodes running dedup services 420A-D, respectively. It should be appreciated that the cluster may include any number of front-end nodes and any number of back-end nodes.

Client 405A seeks to perform a file operation involving file1 425A. Client 405B seeks to perform a file operation involving file2 425B. Client 405C seeks to perform a file operation involving file3 425C. Client 405D seeks to perform a file operation involving file4 425D.

In the scale out cluster environment there are various namespace nodes which a client (e.g., DDBoost client) can connect to for namespace operations and data operations as a pass through. In an embodiment, for a particular file its file operations are handled by a particular namespace node for efficiency and performance reasons. In an embodiment, the client (e.g., DDBoost client) executes the load balancing algorithm (which uses the cluster configuration details) to identify and redirect to an appropriate namespace nodes for relevant file operations.

For example, according to the load balancing algorithm executed by client 405A, file operations involving file1 425A have been redirected to namespace service 415A. According to the load balancing algorithm executed by client 405B, file operations involving file3 425C have been redirected to namespace service 415B. According to the load balancing algorithm executed by client 405C, file operations involving file2 425B have been redirected to namespace service 415A. According to the load balancing algorithm executed by client 405D, file operations involving file4 425D have been redirected to namespace service 415B. As shown in the example of FIG. 4, a load balancer that would typically be positioned between the clients and cluster is omitted and not present.

File system protocols are very different from object storage protocols as file system protocols require handling complexities such as namespace updates including file and folder creation and deletion as well as random IO reads and writes to files. In an embodiment, the front-end service manages the namespace operations and builds a tree structure for files to support random IO. As discussed, the data for a file is divided into large units which may be referred to as L1s (level one in a multi-level tree) spanning megabytes of content. The front-end then assigns or directs the data to a back-end service where deduplication is performed along with compression and storage of the data to the underlying storage system. In an embodiment, any front-end can handle namespace operations and file access. Each front-end may be responsible for a subset of files and maintains state in-memory for efficiency. The state is globally available and can be handled by other instances should an instance fail.

For namespace operations, the front-end accesses a Btree structure holding the namespace. A Btree is a self-balancing tree data structure that maintains sorted data and allows searches, sequential access, insertions, and deletions in logarithmic time. This Btree structure has the complete folder and file structure of the storage system as well as file inodes. The structures may be partially cached on an instance of the front-end for performance, but the structures are globally accessible in shared storage in case an instance fails and another instance takes over the file handle hash range.

For folder and file updates, the Btree structure for the namespace is updated. Updating the Btree structure for the namespace includes acquiring a lock on relevant pages of the Btree, making the updates, and updating storage. The upper parts of the Btree may be cached in memory for efficiency. Global locks may be used to avoid concurrent updates to structures.

For a file write, the front-end creates a hierarchical tree structure representing the file, which may be referred to as the Lp tree (Level tree). The L1 nodes of the tree refer to L0 segments by a fingerprint (hash and other metadata). The front-end processes incoming data from a client to generate segments (e.g., variable 8 KB in size) that are the L0s of the tree, and then the upper levels of the tree reference lower levels.

For reads and random IO, the front-end loads the Lp tree for a file from shared storage. A random read or write is handled by finding the position in the tree that refers to the requested data, and any updates to the Lp tree are handled by the front-end. Overwrites to a L1 are transferred to the back-end responsible for that L1 based on its similarity group. Thus, front-end nodes are responsible for the upper part of the Lp tree (e.g., L6-L2 segments, FIG. 3) while back-end nodes are responsible for L1 segments.

The front-end forms a L1 and transfers the L1 content (hundreds to thousands of segments) to a back-end for deduplication and storage. A multi-megabyte L1 is formed in a content defined manner and a boundary between L0 segments is selected using a consistent algorithm. The front-end then represents the L1 span of data with a similarity group that is a numeric value in a specified range (e.g., 0-127).

The front-end then uses a data structure referred to as a similarity group to determine which back-end instance is responsible for the L1. Each back-end is responsible for a particular range of similarity groups. For example, a first back-end may be responsible for similarity groups in the range of 0-63. A second back-end may be responsible for similarity groups in the range of 64-127, and so forth. The similarity group is consistently hashed to a back-end, and the mapping of similarity group assignments is maintained. If a back-end fails or there are scale-up or scale-down events, the front-end instances are alerted about changes in the consistent hashing table.

An L1 segment may contain hundreds to thousands of L0 segments. The back-end is primarily responsible for deduplication, compression, and storage of the L0 segments. Each similarity group is its own deduplication domain, and since a similarity group is managed by a single back-end, the issue of different back-ends simultaneously updating structures related to similarity groups is avoided.

The back-end checks the L0 fingerprints against its memory cache. Only fingerprints associated with the same similarity group are filtered against. This means that the back-end has separate fingerprint caches for each similarity group, though many of the caches may be empty at any given time due to memory constraints.

If fingerprints match in the similarity group-based cache, the corresponding L0 segments are filtered out and do not need to be stored again. Otherwise, a fingerprint index for the similarity group is queried. Lookups to the fingerprint index are rate limited such as only allowing one lookup per 1 megabyte (MB) of content. The fingerprint index maps from a <fingerprint, similarity group> to a data structure holding the location where the segments are stored in a compression region as well as the location where a list of fingerprints is stored that were previously stored consecutively. In an embodiment, there is a data storage structure referred to as a CMETA container. The CMETA container includes a header and metadata sections of multiple data containers. The CMETA structure is loaded from shared storage to the fingerprint cache for the current similarity group and a check of L0 fingerprints against the cache is performed.

For all L0 segments that are not duplicates, the unique segments are compressed into one or more compression regions. In an embodiment, the compression region size ranges from 64K-128 KB but may vary in other embodiments. Compression regions are packed into a larger structure (container or object) that is written to shared storage, and the fingerprints for L0 segments of the same similarity group in that container are stored as a CMETA structure. The fingerprint index for the similarity group is updated to record the location and size of the L0 segment's compression region as well as the location of the CMETA structure.

Once the compression regions are durably stored (not necessarily to the long term storage), the back-end communicates with the front-end that the data is durable, and the front-end can acknowledge updates from the clients.

Since a similarity group is consistently assigned to a back-end instance, a read after write will route L1 accesses to the same back-end that processed the data, and the L0 segments may still be in the local cache. If not in the local cache, the back-end has the unique responsibility to access the L0 segments from shared storage. A further discussion is provided in U.S. patent application Ser. No. 17/215,586, filed Mar. 29, 2021, which is incorporated by reference along with all other references cited.

In an embodiment, the load balancing algorithm for distributing a client's load across various namespace nodes is conducted according to a consistent hash algorithm. For example, ranges of hash values or keys may be mapped to the different namespace nodes. The client may then hash a file handle of a file on which a file operation is sought and compare the hash with the mapping to identify the front-end that should be responsible. It should be appreciated, however, that the clients may execute any competent load balancing algorithm (e.g., round robin) to spread or distribute load across the front-ends.

For example, in other embodiments, there can be an algorithm that counts on resource usage of the namespace nodes. The algorithm accepts as input cluster configuration details such as the number of nodes, number of services, number of domains, number of failure domains in the cluster, or combinations of these. The namespace nodes may send the selection in terms of which algorithm the client should use or it can also send binary code of the algorithm. For example, in an embodiment, a client or, more particularly, the client-side library may have multiple, e.g., two or more, available load balancing algorithms. In this embodiment, the namespace node sends to the client an indication of which load balancing algorithm to use. Alternatively, in another embodiment, the namespace nodes sends the binary code of the algorithm that the client should use.

The cluster information is sent to the client (e.g., DDBoost client) so that each client can independently run the same algorithm with the various cluster information to distribute workload. In an embodiment, the client makes an initial connection to one of the namespace node in the cluster and exchanges relevant information before bouncing the connection to an appropriate namespace node. Further discussion is provided below. In an embodiment, the connections and redirections are achieved transparent to backup application by the client-side library (e.g., DDBoost client library).

FIG. 5 shows an overflow of a process for offloading namespace redirection to clients of a scale out cluster. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 510, a load balancing algorithm and cluster configuration details are stored at each of a set of namespace (or front-end) nodes in a cluster hosting a deduplicated file system. In an embodiment, since the clients do not connect directly to the back-end or dedup nodes, the load balancing algorithm and cluster configuration details are not stored at the back-end or dedup nodes. In a step 515, upon a client of the cluster connecting to a namespace node, a server-initiated communication channel is established between the client and the namespace node that allows the namespace node to send to the client updates to the load balancing algorithm, cluster configuration details, or both.

In a step 520, the load balancing algorithm and cluster configuration details are sent from the namespace node to the client. In a step 522, the client runs the load balancing algorithm using the cluster configuration details as input to identify a particular namespace node that should handle a file system operation. In a step 523, the client assigns the file system operation to the identified particular namespace node.

Figure 6:
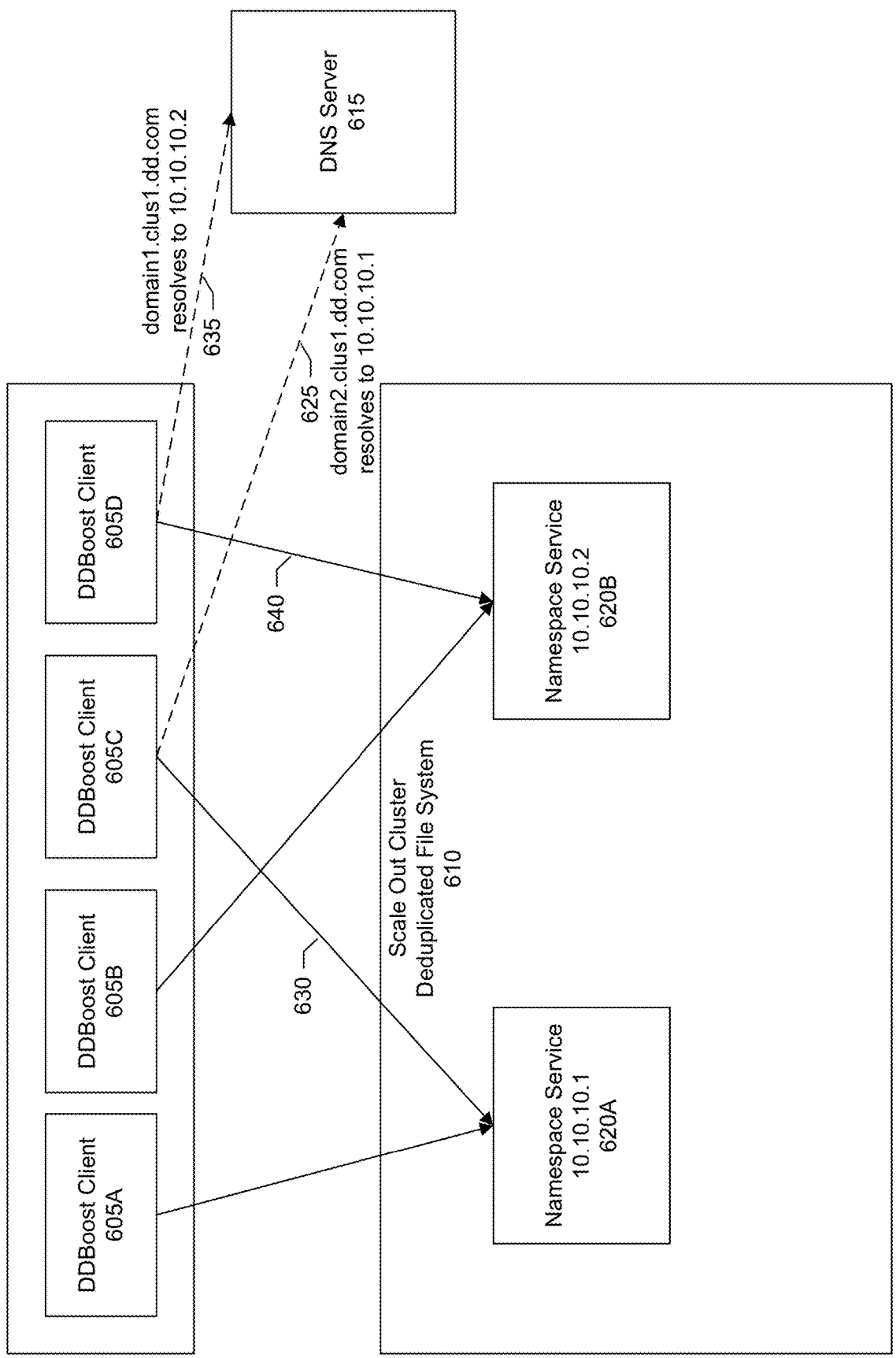
FIG. 6 shows a block diagram of operations during an initial connection to the cluster, according to one or more embodiments.

More particularly, FIG. 6 shows a block diagram illustrating an initial connection by the client to the scale out cluster. As shown in the example of FIG. 6, there are a set of clients 605A-D, scale out cluster 610, and domain name system (DNS) server 615. The scale out cluster includes first and second front-end or namespace nodes hosting first and second instances of a namespace service 620A,B, respectively. First namespace service 620A is associated with Internet Protocol (IP) address 10.10.10.1. Second namespace service 620B is associated with IP address 10.10.10.2.

Whenever a client (e.g., DDBoost client) makes its initial or first ever connection to the scale out cluster, it can connect to any of the namespace nodes via DNS resolution. In the example shown in FIG. 6, the DNS server has received a request 625 from third client 605C to resolve a domain name having the value "domain2.clus1.dd.com." The DNS server locates a corresponding IP address as being "10.10.10.1" and returns the corresponding IP address to third client 605C. Third client 605C can then initiate a request 630 directly to the namespace service associated with IP address "10.10.10.1" (e.g., first front-end or namespace node).

Similarly, the DNS server has received a request 635 from fourth client 605D to resolve a domain name having the value "domain1.clus1.dd.com." The DNS server locates a corresponding IP address as being "10.10.10.2" and returns the corresponding IP address to fourth client 605D. Fourth client 605D can then initiate a request 640 directly to the namespace service associated with IP address "10.10.10.2" (e.g., second front-end or namespace node).

The DNS server can resolve to any of the namespace node in round robin or any equivalent scheme. A separate domain can have DNS name including the domain to avoid clients connecting across domains as shown in FIG. 6. As discussed, this will be the very first client connection to the scale out cluster.

Figure 7:
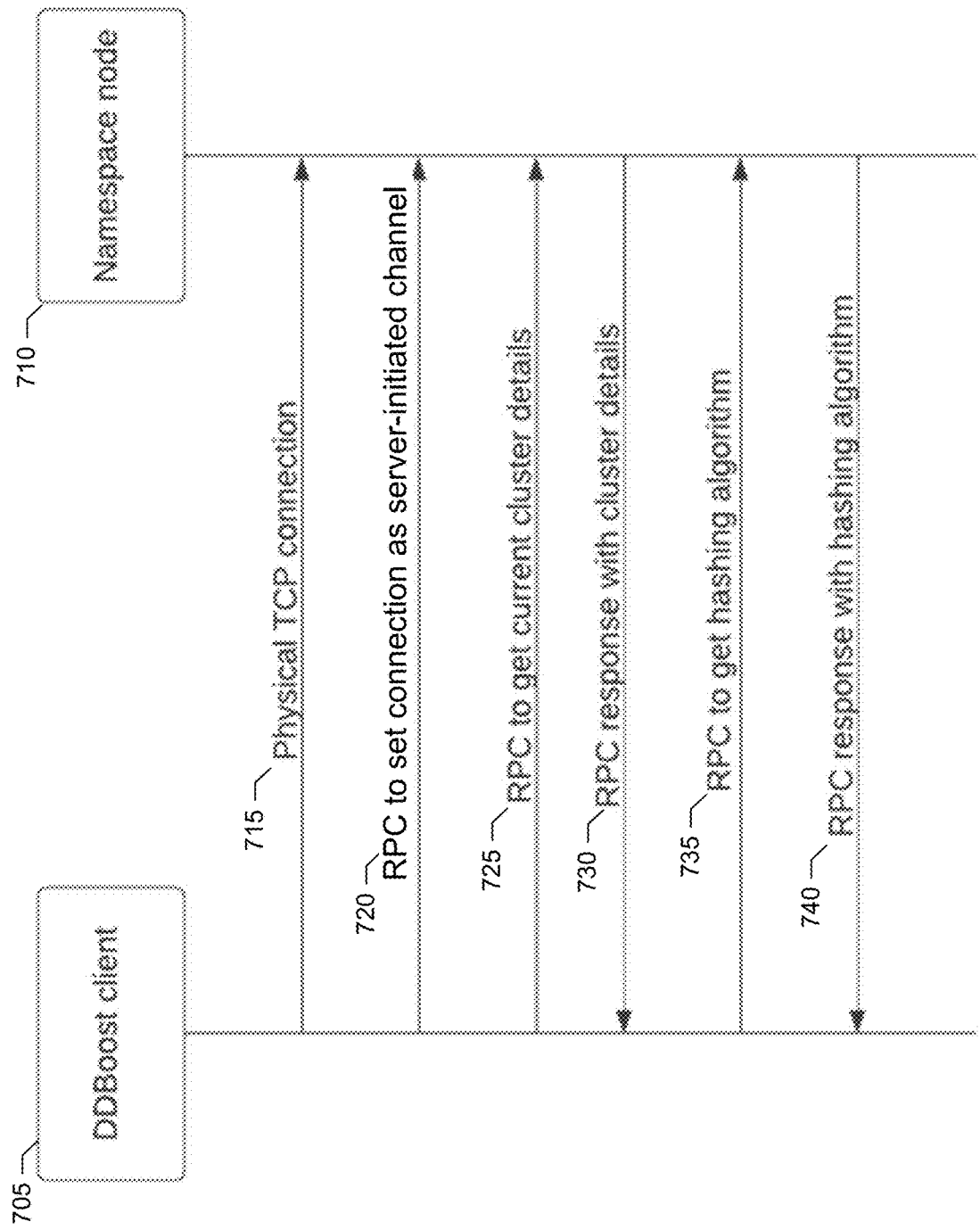
FIG. 7 shows a sequence diagram for an initial connection to the cluster, according to one or more embodiments.

In an embodiment, an initial remote procedure call (RPC) sequence between the client and namespace node includes the client requesting from the namespace node the cluster configuration details and load balancing algorithm for redirection. That is, once the client (e.g., DDBoost client) is connected to an initial namespace node, the client requests information about the cluster details and algorithm to select for redirection. In an embodiment, the DDBoost client sends two different RPCs to the initial namespace node to obtain the information as shown in the sequence of FIG. 7. During subsequent workflows, the DDBoost client can also send both RPCs separately when it needs to discover the updated cluster details and updated hashing algorithm. For example, in an embodiment, the client may be configured to periodically request updated cluster configuration details, an updated load balancing algorithm, or both from the namespace node. Instead or additionally, the request for updates may be triggered when a timeout or other delay occurs in receiving a response from a namespace node.

In an embodiment, the client issues a first RPC to obtain the algorithm for the redirection or alternatively binary code for hash calculation (e.g., load balancing algorithm). The client issues a second RPC to obtain current configuration details of current nodes in the cluster. It should be appreciated that the RPCs may be issued in any order. Table A below shows an example of an RPC message that may be sent by the client to the namespace node to obtain the load balancing algorithm.

TABLE A

| |
|---|
| // RPC message to find algorithm details<br>typedef struct rpc_redirection_algorithm {<br>   int algo_selection; //number or binary code<br>   int workload_hint;<br>};<br>// RPC response for algorithm details<br>typedef struct rpc_redirection_algorithm_resp {<br>   int algo_selected; // number or binary code<br>   union { RPC message data};<br>}; |

Table B below shows an example of an RPC message that may be sent by the client to the namespace node to obtain the cluster configuration details.

TABLE B

| |
|---|
| // RPC message to find cluster details<br>typedef struct rpc_request_cluster_details {<br>   int rpc_version;<br>   int request_type; // requesting one or more cluster details<br>};<br>// RPC response with cluster details<br>typedef struct rpc_server-initiated_msg {<br>   struct node_details [ ]; // can include fqdn, ip etc.<br>   struct domain_details [ ]; // can include various domain ids<br>   struct cluster_details [ ]; // can include total number of<br>nodes and etc.<br>}; |

FIG. 7 shows a swimlane diagram of an initial RPC sequence between a client (e.g., DDBoost client) 705 and an initial namespace node 710. As shown in the example of FIG. 7, in a first step, the sequence begins with a physical Transmission Control Protocol (TCP) connection 715 to the namespace node. In a second step, an RPC 720 is issued by the client to the namespace node to set a connection as a server-initiated channel. The server-initiated channel forms part of a bi-directional communication channel that allows the namespace node to notify the connected client of any changes such as updates to the cluster configuration details, updates to the load balancing algorithm, or both. In particular, the namespace node can itself initiate, generate, or issue an RPC to the client that provides the client with the updates to the cluster configuration details, updates to the load balancing algorithm, or both.

In a third step, an RPC 725 is issued by the client to the namespace node to obtain current cluster configuration details. In a fourth step, the namespace node responds 730 to the RPC with the cluster configuration details.

In a fifth step, an RPC 735 is issued by the client to the namespace node to obtain the load balancing or hashing algorithm that the client should use when determining which namespace node should handle a particular file system operation.

In a sixth step, the namespace node responds 740 to the RPC with the load balancing or hashing algorithm to use. The client downloads the algorithm from the namespace node and which is provided in a byte code format. The client also downloads from the namespace node the cluster membership or configuration details (e.g., number of namespace nodes and their corresponding IP addresses). The client, upon receiving the cluster configuration details and load balancing algorithm, runs the algorithm using the cluster configuration details to identify a namespace node to handle a particular file system operation. The identified namespace node may be different from or the same as the initial namespace node.

In an embodiment, a method includes: receiving, at a client-side library from an application, a request for a file system operation; issuing to a domain name system (DNS) server a resolution request comprising a domain name for the DNS server to resolve; receiving from the DNS server an Internet Protocol (IP) address of an initial namespace node; initiating a connection to the initial namespace node via the IP address, the initiating a connection comprising: issuing a first remote procedure call (RPC) to the initial namespace server to establish a server-initiated communication channel between the client-side library and the initial namespace node over which changes to a load balancing algorithm, cluster configuration details, or both will be sent from the initial namespace node to the client-side library; issuing a second RPC to the initial namespace server to request the cluster configuration details; receiving, responsive to the second RPC, the cluster configuration details; issuing a third RPC to the initial namespace server to request the load balancing algorithm; and receiving, responsive to the third RPC, the load balancing algorithm; running the load balancing algorithm using the cluster configuration details to identify a namespace node that should be assigned the file system operation; and forwarding the request for the file system operation to the identified namespace node.

The method may further include receiving, at the client-side library over the server-initiated communication, an RPC from the initial namespace node comprising an updated version of the load balancing algorithm; and replacing an existing version of the load balancing algorithm at the client-side library with the updated version of the load balancing algorithm. The method may further include receiving, at the client-side library over the server-initiated communication, an RPC from the initial namespace node comprising an updated version of the cluster configuration details; and replacing an existing version of the cluster configuration details at the client-side library with the updated version of the cluster configuration details.

Referring back now to FIG. 5, in a step 525, the cluster is monitored by the cluster event manager for updates to one or more of the load balancing algorithm or cluster configuration details. In a step 530, when there have been updates, the updates are sent by the cluster event manager to each of the namespace nodes. In a step 535, the updates are sent from the namespace nodes to the client over the server-initiated communication channel. The client, upon receiving an update, replaces a previous version of the information with the updated information.

In other words, at any time after the client has connected to the cluster and a change is made to the cluster—such as an addition of a namespace node to the cluster, a removal of a namespace node from the cluster, an addition of a service to the cluster, a removal of a service to the cluster, or a software upgrade involving the cluster (e.g., updates to the load balancing algorithm)—a notification detailing or describing the change is immediately sent out over each of the server-initiated communication channels to each connected client so that each client can, at runtime, dynamically use the updated information to conduct the load balancing of the file system operations that have been requested.

For example, upon the client receiving an updated version of the cluster configuration details (but not an updated load balancing algorithm), the client replaces a previous version of the cluster configuration details with the updated version of the cluster configuration details and uses the updated cluster configuration details with the already or previously existing load balancing algorithm. As another example, upon the client receiving an updated version of the load balancing algorithm (but not cluster configuration details), the client replaces a previous version of the load balancing algorithm with the updated version of the load balancing algorithm and uses the updated load balancing algorithm with the already or previously existing cluster configuration details. Likewise, each namespace node having received an update to the cluster configuration details, load balancing algorithm, or both, replaces corresponding previous versions of the cluster configuration details and load balancing algorithm. This allows a client connecting to any namespace node to thus receive the latest or most recent versions of the cluster configuration details and load balancing algorithm.

Figure 8:
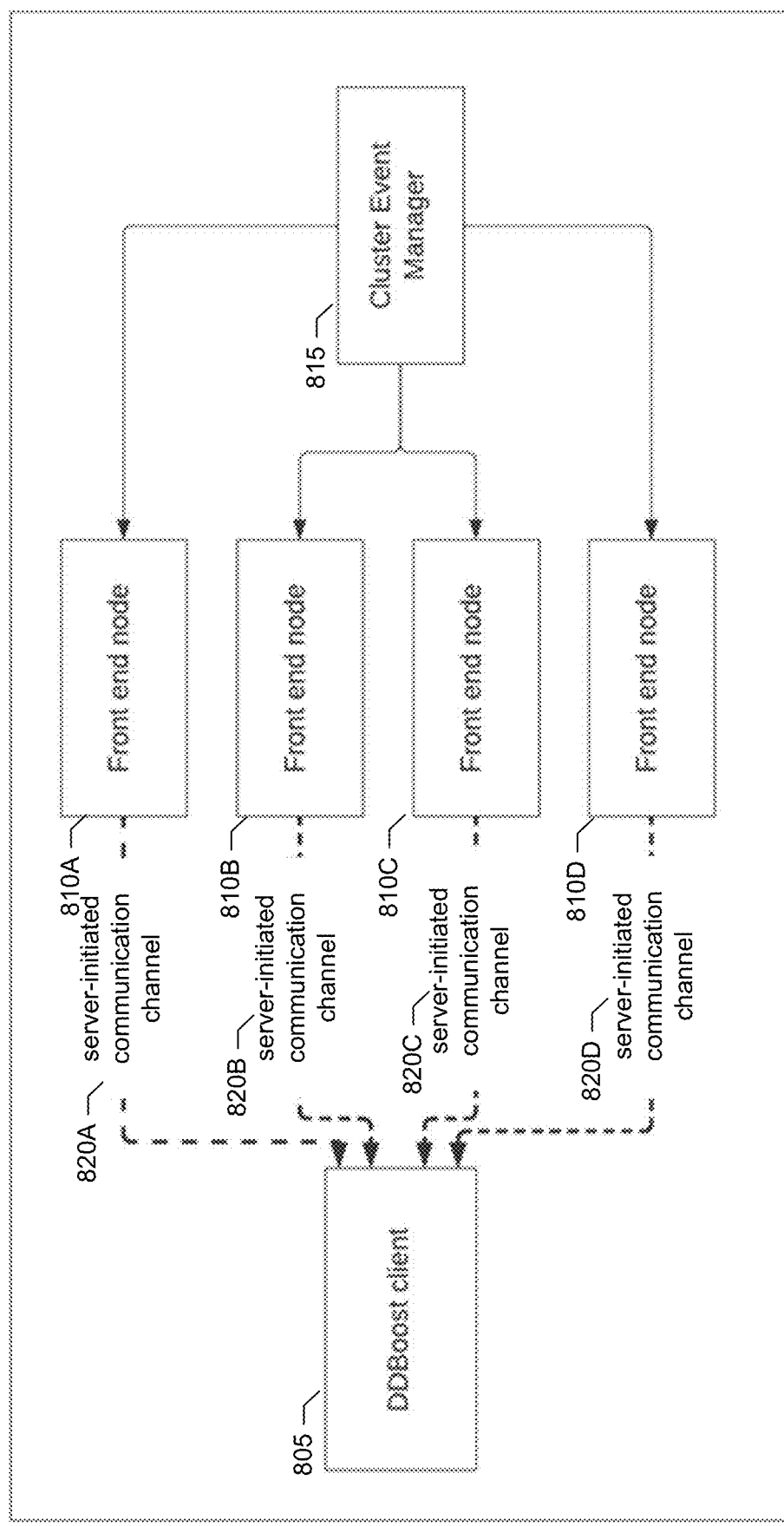
FIG. 8 shows a block diagram of server-initiated communication connections, according to one or more embodiments.

More particularly, FIG. 8 shows a block diagram of an example for handling cluster updates. In the example of FIG. 8, there is a client 805 (e.g., DDBoost client), a set of front-end or namespace nodes 810A-D, and a cluster event manager 815 connected to each of the namespace nodes. Server-initiated communication connections 820A-D have been established from each of the namespace nodes to the client.

As discussed, whenever the client makes an initial connection to a namespace nodes (e.g., client issues an RPC to the namespace node), a server-initiated communication channel is established between the client and the namespace node. In an embodiment, during the initial connection to the namespace node, the client indicates to the namespace node that a server-initiated communication channel should be established. For example, the client may indicate in an RPC that is sent to the namespace node to obtain the cluster configuration details that a server-initiated communication channel should also be established.

The cluster event manager is responsible for notifying the namespace nodes about changes or updates to one or more of the load balancing algorithm, cluster configuration details, or both. The server-initiated communication channel allows the namespace nodes to pass those changes or updates to the client.

More particularly, whenever changes to cluster nodes or services occur such as new node being added, new service being added, node or service being removed, and the like, the namespace nodes can notify back to the clients using the server-initiated channel (or DDBoost server-initiated communication channel) to the client so that the client can redirect to different namespace nodes itself based on the file in question.

As discussed, in an embodiment, a DDBoost client (or client-side library) is a component that is integrated with a backup application or agent processes. A server-initiated communication channel is established with each namespace node connected. Namespace or front-end nodes (also referred to as AoB) are responsible for all namespace operations. Anytime a connection (e.g., DDBoost connection) is established a server-initiated communication channel (e.g., DDBoost server-initiated connection) is established as well. The cluster event manager monitors all namespace or front-end nodes and services and can notify other services about health status of the cluster.

Table C below shows examples of data structures for notifying clients about change events over the server-initiated communication connection channel.

TABLE C

```
/* Different events to be notified supported by server-initiated
connection */
enum event_opcode {
    EVENT_NULL = -1,
    EVENT_AOB_UPDATE = 1,
    EVENT_DOMAIN_UPDATE =2,
    ...
    EVENT_CLUSTER_UPDATE = 31
};
/* Server-iniated response structure
* rpc_version - version of rpc
* server-initiated_event_id - msg id from server-initiated
* opcode - opcode of event to be notified
* event_data - data of the notification
* /
struct server-initiated response {
    dd_uint32_t rpc_version;
    dd_uint32_t server-initiated_event_id;
    server-initiated_event_opcode opcode;
    server-initiated_response *event_data;
};
/* Union for event response data. New events can be added easily
based on event opcodes */
union event_response switch (event_opcode opcode) {
    case EVENT_AOB_UPDATE:
        aob_response aob_resp_v1;
    default:
        default_response default_resp_v1;
};
/* Default response. */
struct default_response {
    event_opcode opcode;
    dd_uint32_t pad [15];
};
/* aob_response
* opcode - event notification opcode
* aob_count - new aob count
* hashing_algo - hashing algo to be used by DDBoost client for
redirection
* aob_ips - new aob_ips
*/
struct aob_response {
    event_opcode opcode;
    dd_uint32_t aob_count;
```

TABLE C-continued

```
    dd_uint32_t hashing_algo;
    string aob_ips< >;s
};
```

As a client (e.g., DDBoost client) connects to different nodes as required, a server-initiated communication channel to each connected node is established. Thus, as shown in the example of FIG. 8, the client has first, second, third, and fourth server-initiated communication connections 820A-D to nodes 810A-D, respectively, in addition to four forechannel connections to the namespace nodes. On the event of a cluster membership change all namespace nodes are updated with the new membership information from the cluster event manager and, via the server-initiated communication channel, each namespace node notifies the client of this membership change. The namespace node sends an event ID and updated nodes information along with their corresponding IP addresses. The client (e.g., DDBoost client) can disregard duplicate requests and update the cluster membership information maintained on the client. Having each namespace node send the updates also provides for redundancy.

A change in cluster membership can be an addition of a namespace node or a deletion of a namespace node. Both events can be notified to the client (e.g., DDBoost client) by the other namespace nodes. All namespace nodes are aware of other nodes in cluster and are always kept up to date by cluster event manager.

Using this updated cluster membership information, the client (e.g., DDBoost client) redirects and connects to different namespace nodes as required using the hashing or load balancing algorithm specified by the namespace node during the initial connection or any subsequent RPC generated to update hashing or load balancing algorithm. With this mechanism the need for a file system redirection proxy (FSRP) service is not required. Also, based on the file operation the client (e.g., DDBoost client) having knowledge of the file directory structure can redirect all requests to one particular namespace node so that distributed lock manager (DLM) grant bounces are reduced or minimized.

In an embodiment, the server-initiated communication channel from the namespace node to the client continues to be maintained after the client makes an initial connection to the namespace node. For example, the initial connection may include an authorization handshake to authenticate the client. The server-initiated communication channel connection can continue after the authentication has been completed without the client having to again authenticate. The server-initiated communication channel allows for callback requests to be issued from the namespace node to the client so that the client can receive updates to one or more of the load balancing algorithm, cluster configuration details, or both. The server-initiated communication channel may be referred to as a backchannel, downstream-channel, client-directed channel, or client-bound-channel.

Figure 9:
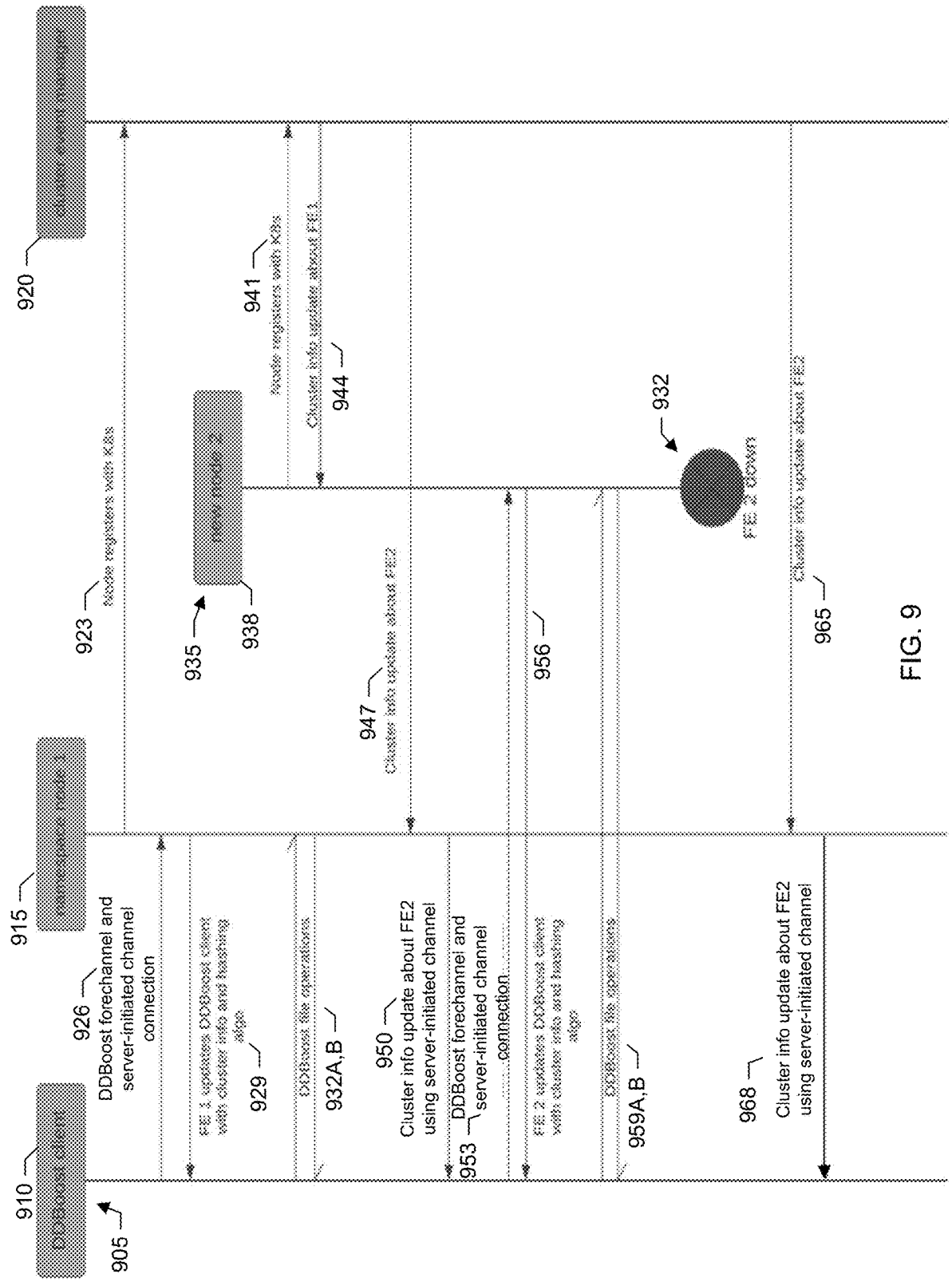
FIG. 9 shows an overall sequence diagram for offloading redirection to a client, according to one or more embodiments.

FIG. 9 shows a sequence diagram of an example for handling changes in the file system cluster. At a first time 905, there is a client 910 (e.g., DDBoost client), a first namespace (or front-end) node 915, and a cluster event manager 920. In a step 923, the first namespace node registers with the cluster event manager. The registration makes the cluster event manager aware of the namespace node. The registration with the cluster event manager allows the node to receive updates to changes in the cluster such as a new node being added or an existing node being removed. In other words, an RPC originates from the front-end node to the client-side library to inform the client of cluster membership changes, changes to the load balancing algorithm, or both. The client-side library, in turn, communicates with the client application when needed depending on the request. In an embodiment, the cluster event manager is associated with a Kubernetes (K8) management system for containerized applications.

In a step 926, the first namespace node makes an initial connection to the first namespace node, thereby establishing a forechannel and server-initiated communication channel connection with the first namespace node. In a step 929, the first namespace node sends to the client information about the cluster (e.g., number of nodes in the cluster) and the load balancing or hashing algorithm.

In steps 932A,B, the client executes the load balancing algorithm using the cluster information to identify a particular namespace node that should be assigned a particular file system operation to handle. FIG. 9 shows the file operations being assigned to the first namespace node. It should be appreciated, however, that depending on the result of the load balancing calculation by the client, the requested file operations may be redirected to a different namespace node.

At a second time 935, after the first time, and while file operations involving the first namespace node may be in progress, a new second namespace (or front-end) node 938 has been added to the cluster. In a step 941, the second namespace node registers with the cluster event manager. As discussed, the registration with the cluster event manager allows the node to receive updates to changes in the cluster such as a new node being added or an existing node removed.

In a step 944, the cluster event manager sends to the second namespace node updated cluster information indicating that the cluster also includes the first namespace node. Similarly, in a step 947, the cluster event manager sends to the first namespace node updated cluster information indicating that the cluster now also includes the second namespace node.

In a step 950, the first namespace node passes to the client updated cluster information, over the server-initiated communication channel, identifying the second namespace node as now being available in the cluster. In an embodiment, the server-initiated communication channel between the client and namespace node is continuously maintained so long as the forechannel communication between the client and namespace node is present. The server-initiated communication channel is maintained as a separate connection between the namespace node and client. The server-initiated communication link is not disconnected so long as the forechannel communication link is present.

In a step 953, the first namespace node makes an initial connection to the second namespace node, thereby similarly establishing a forechannel and server-initiated communication channel connection with the second namespace node.

In a step 956, the second namespace node updates the client with cluster information and a new load balancing or hashing algorithm.

In steps 959A,B, the client executes the updated load balancing algorithm using the updated cluster information to identify a particular namespace node that should be assigned a particular file system operation to handle. FIG. 9 shows this particular file operation being assigned to the second namespace node. Again, it should be appreciated that depending on the result of the load balancing calculation by the client, the requested file operations may be redirected to a different namespace node.

At a third time 962, after the first and second times, the second namespace node has become unavailable. The unavailability of the second namespace node is detected by the cluster event manager. For example, the cluster event manager may maintain a heartbeat connection with each of the nodes of the cluster to monitor the cluster health.

In a step 965, the cluster event manager detects the failure event of the second namespace node and sends to the first namespace node updated cluster information indicating that the second namespace node has become unavailable.

In a step 968, the first namespace node passes the updated cluster information indicating the unavailability of the second namespace node to the client via the server-initiated communication channel. The client makes an adjustment and updates its configuration details for the cluster so that it will no longer assign file system operation requests to the second namespace node.

In an embodiment, a design of the system allows a client to receive multiple identical copies or updates about the load balancing algorithm and cluster configuration details. For example, referring back now to FIG. 8, when the client makes an initial connection to first namespace or front-end node 810A, the client is sent the load balancing algorithm and cluster configuration details from the first node and first server-initiated communication channel 820A is established from the first node to the client.

Consider, as an example, that the cluster configuration details identify second, third, and fourth nodes 810A-D as also being available. The client then runs the load balancing algorithm using the cluster configuration details and identifies second node 810B as being the node that should be assigned a particular file system operation.

As a result, the client makes an initial connection to second node 810B. The client is again sent the load balancing algorithm and cluster configuration details and second server-initiated communication channel 820B is established from the second node to the client. Assuming that there have been no changes to the load balancing algorithm or cluster configuration, the load balancing algorithm and cluster configuration details will be the same as that received from the first node when the client made the initial connection to the first node. In an embodiment, the client includes logic to disregard or ignore duplicate pieces of information.

For example, cluster change or update events detailing changes to the cluster configuration, load balancing algorithm, or both may include an identifier. The client can compare a change event identifier currently received with a change event identifier last received. When the change event identifiers match, the client can determine that it already has the most recent versions of the load balancing algorithm, cluster configuration details, or both and that the changes associated with the current change event identifier can be ignored. When the change event identifiers do not match, the client can determine that it does not have the most recent versions of the load balancing algorithm, cluster configuration details, or both. Thus, the client can replace the previous versions of the load balancing algorithm, cluster configuration details, or both with the load balancing algorithm, cluster configuration details, or both that are associated with the current change event identifier.

In an embodiment, the technique for offloading redirection logic to clients as described above is extendable in terms of granular level redirection such as for byte-ranges or redirecting to namespace nodes versus deduplication nodes.

The following is a detailed discussion of the server-initiated communication channel that may be used to communicate from a node to a client according to one or more embodiments. In an embodiment, specific aspects of the server-initiated communication channel are implemented in a data storage backup system referred to as Data Domain Restorer (DDR) where clients of the storage system are referred to as DDBoost clients. Again, it should be appreciated that this is merely one particular implementation and aspects and principles can be applied to other systems.

Figure 10:
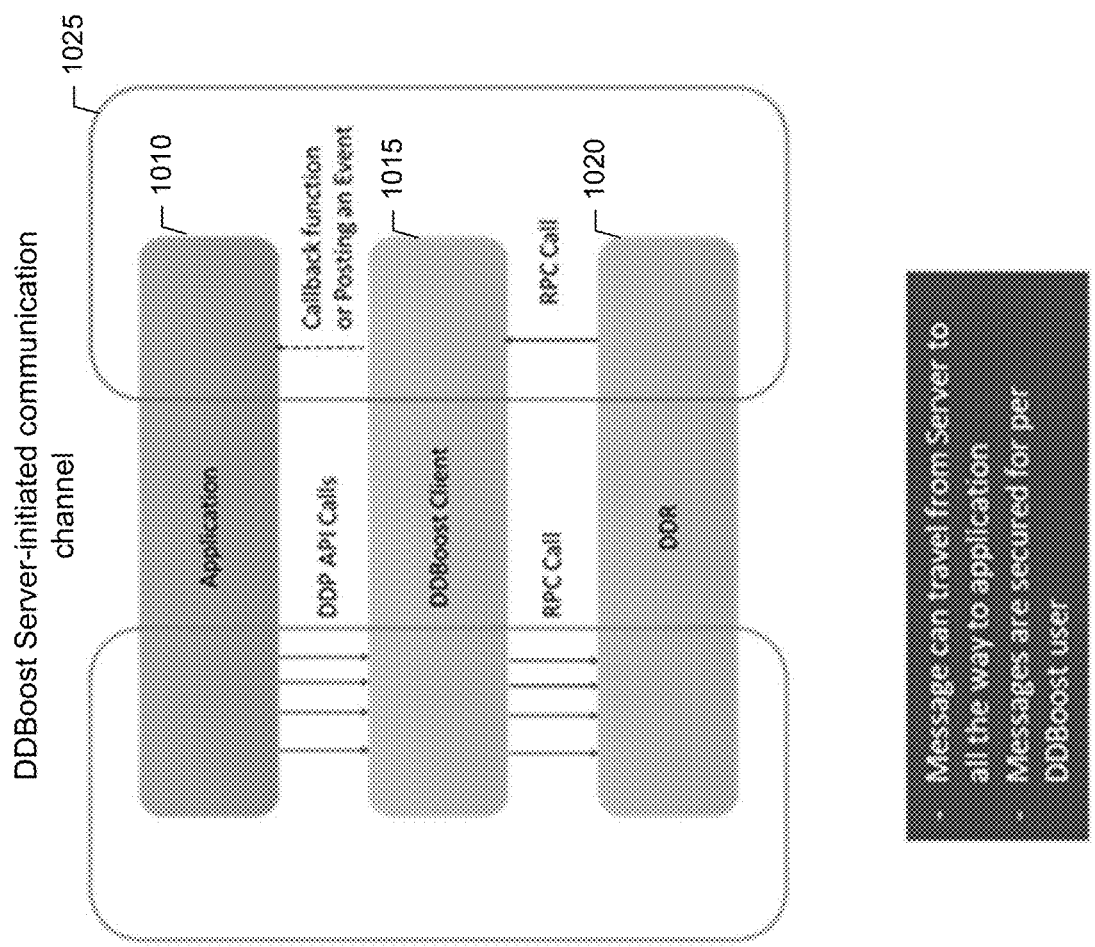
FIG. 10 shows a block diagram of a server-initiated communication connection, according to one or more embodiments.

FIG. 10 shows a block diagram of a DDBoost server-initiated communication channel workflow. The example shown in FIG. 10 includes an application 1010 (e.g., client backup application), DDBoost client 1015 (e.g., client-side library), and DDR server 1020. In an embodiment, systems and techniques are provided for secure end-to-end notification of DDBoost server-side events. A typical workflow from a backup application to DDR via a DDBoost client is as follows. An application calls an API referred to as DDP API into the DDBoost client and the DDBoost client sends one or more RPCs to DDRs.

In an embodiment, systems and techniques are provided for a protocol that allows server-side events to be sent back to the client and application. In an embodiment, the connection protocol is referred to as a server-initiated communication channel 1025. The server-initiated channel is used for cases where callback requests from DDR to DDBoost clients are required. Messages can travel from the server (e.g., DDR) to the DDBoost client to the application. The messages are secured for each DDBoost user.

In various embodiments, systems and techniques are provided for end-to-end and secured events messaging for client, authenticated user or storage unit specific events; mechanisms allowing file system level subsystems to use the server-initiated channel to deliver events; delivering messages back to either one client or multiple clients or all the clients; processing dead (or hung up) messages; and for switching between an existing connection to receive a server-initiated communication message on the client (without needing to have sessions).

Figure 11:
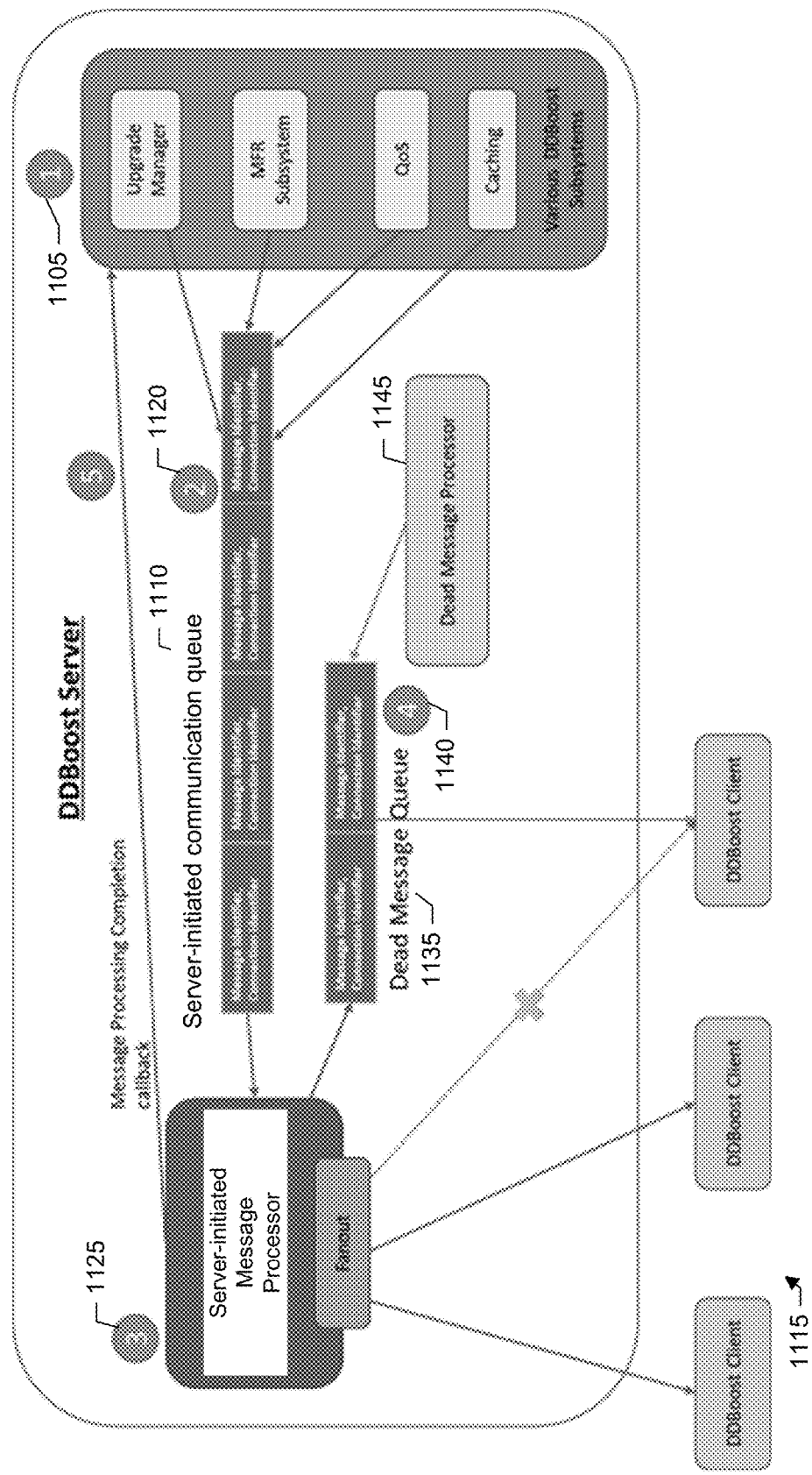
FIG. 11 shows a block diagram of a server-initiated communication connection at a server-side, according to one or more embodiments.

FIG. 11 shows a block diagram illustrating an overview of a DDBoost server-side implementation. In a first step 1105, various DDBoost/file system subsystems enqueue messages to a server-initiated message queue 1110 whenever they want to send out a message to a DDBoost client 1115 or backup application. Some examples of events include MFR job completion, DD is undergoing upgrades, feature toggle change, QoS, and the like. A further listing of use cases are provided in a later discussion. The subsystem is able to register a callback that can be called back when the delivery of the message is successful. The subsystems are able to cancel the message at any point of time until the callback is not called. Cancelling of the message will only cancel the outstanding messages and not the ones which are being processed. Such subsystems can call an API to enqueue the message with the information such as message ID, message data, client identifier and callback function if required. Client identifier is specified in such a way to distinguish whether the message needs to be delivered to single client or multiple clients or all the clients.

In a second step 1120, the server-initiated message queue holds all the outstanding messages that need to be sent to the one client or multiple clients. In an embodiment, the queue is an ordered queue.

In a third step 1125, a server-initiated message processor 1130 retrieves messages from the server-initiated message queue and sends out messages to the DDBoost client. DDBoost server on DD maintains a pool of connections which are marked for server-initiated messages. In order to identify clients uniquely, the DDBoost client sends a unique ID per client instance to the DDBoost server. The server-initiated message processor iterates over the RPC connections and stores private data about the server-initiated message, UserID, StorageUnit, and the like at the RPC layer.

While sending RPC messages back to the client, the server-initiated message processor as shown in FIG. 11 calls the RPC layer helper function to find out all the current connections and filter out connections where an RPC message needs to be sent back based on the message and extra information stored per connection. It then invokes the RPC layer calls to send the message on the wire. If the message is undelivered, it is added to a dead message queue 1135.

In a fourth step 1140, the dead message queue is used for the retry mechanism. This ensures that primary messages are not logged because of unresponsive clients. A dead message processor 1145 works on the dead message queue to continue retry based on a configurable retry count and retry timeouts before abandoning sending out the message.

Table D below shows an example of an RPC server-initiated message.

TABLE D

```
// Server-initiated message that is submitted by subsystem to
   DDBoost Server-initiated Message Queue
typedef struct rpc_server-initiated_msg {
    int msg_type; //ALL_CLIENTS, SPECIFIC_CLIENT
    int stack_id; //connection identifier or 0xffffffff to
indicate all clients
    unique_id_t client_id; // client ID or 0xffffffff
    int msg_number; //RPC message number
    union { RPC message data } ;
};
// RPC message which will travel on the wire from
   DDBoost Server to DDBoost client
typedef struct rpc_server-initiated_msg {
    int msg_type;
    int msg_number; //RPC message number
    union { RPC message data } ;
};
```

Figure 12:
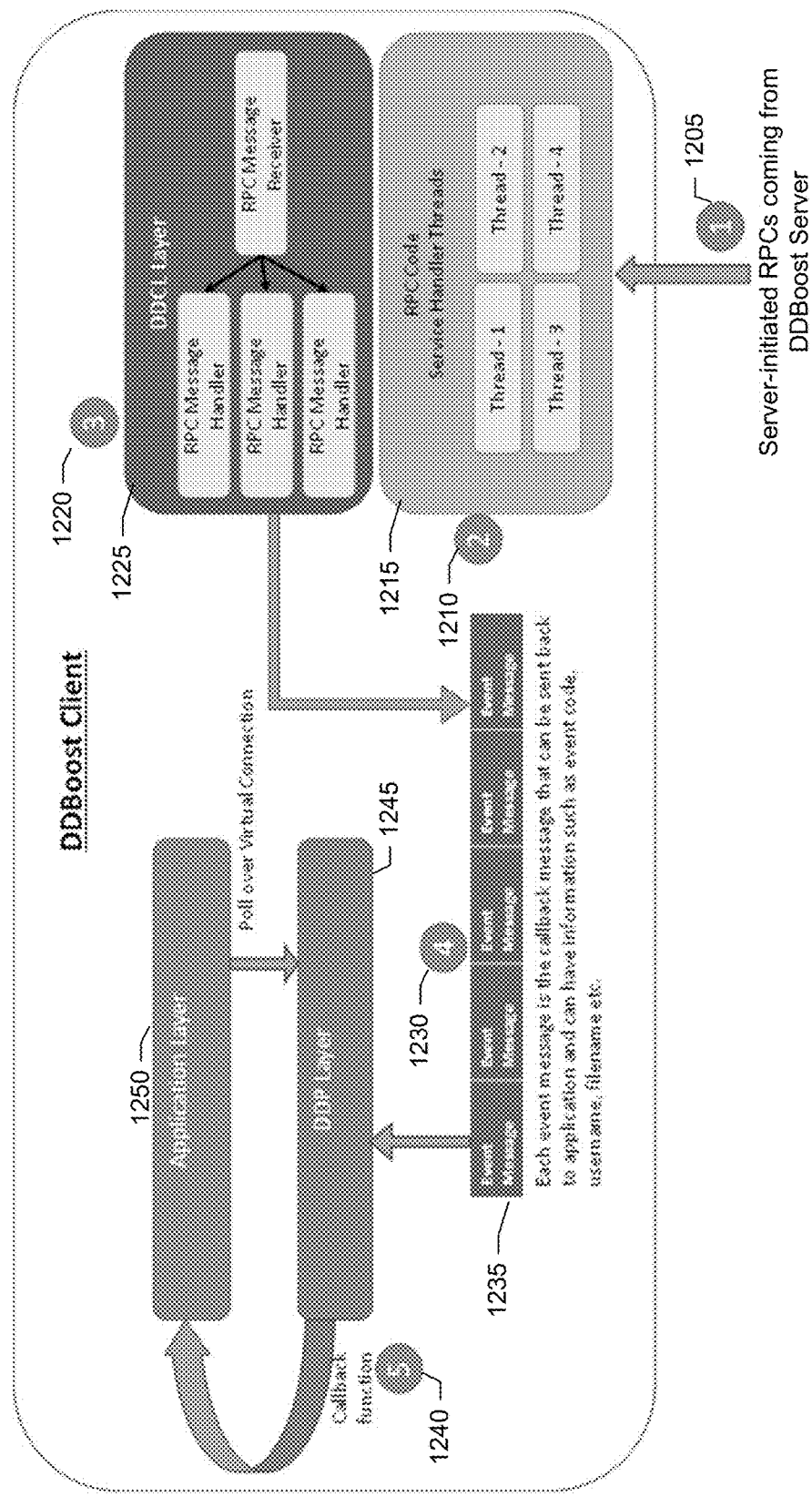
FIG. 12 shows a block diagram of a server-initiated communication connection at a client-side, according to one or more embodiments.

FIG. 12 shows a block diagram illustrating an overview of a DDBoost client-side implementation. In a first step 1205, server-initiated RPC messages are received by an RPC layer on the client side.

In a second step 1210, DDBoost client-side RPC code receives server-initiated messages from the server. Service handler threads 1215 will start processing them. It is not expected to be receiving hundreds of messages at the same time. So, four or about four RPC threads will be enough to be allocated statically for server-initiated message processing.

In a third step 1220, DDCL layer message handlers 1225 conduct RPC message specific processing. These message handlers are defined per RPC message. And a subsequent processing required for a particular message is performed in the DDCL layer.

In a fourth step 1230, an event queue 1235 holds the events that need to be sent back to the backup applications. Once the DDCL layer message handler processes server-initiated message, it can determine if this also needs to be notified to the backup applications (e.g., MFR job completion status). In such scenario, it posts a relevant message to the event queue. The DDCL layer also converts server-initiated message data into application specific data such as including connection and user identifier in the event.

In a fifth step 1240, a DDP layer 1245 can implement a generic callback message that is called into an application space 1250. This basically notifies application that there are events that application can consume. An application can then poll for the events via a DDBoost API.

In an embodiment, server-initiated communication channel creation is driven via DDBoost clients. This is desirable as the DDBoost client does not need to listen on any port and such a requirement is not practically feasible as customers may not want to open any ports in their environment. This also allows driving server-initiated communication channel creation via a DDBoost API and for an application specific scenario. The DDBoost client can also decide when it wants to create server-initiated connection channel or wants to reuse some connection depending on the different application specific environment in which it is working.

The DDBoost client makes a physical TCP connection with the DDBoost server and dedicates that the connection to be used only for server-initiated messages via a technique as described below.

Since the server-initiated channel is per client and per DDR, the connection has to be established during the first physical connection from client to DD and should be closed during the last connection close from client to DD. However, when the connection is established, DD still does not know whether a channel is being used for regular RPCs or for server-initiated RPCs. Thus, a new RPC is introduced to indicate the same.

Table E below shows an example of an RPC to indicate establishment of a server-initiated communication channel.

TABLE E

```
#define USE_CONN_AS_SERVER-INITIATED 1
struct ddp_conn_type_args_v1 {
    dd_uint32_t rpc_version;
    ddp_connection_flag flag;
    string clientid< >; // can be IP address or some client
specific name
};
union ddp_conn_type_args switch (ddp_rpc_version rpc_version) {
    case DDP_RPC_VERSION_1:
        ddp_conn_type_args_v1 v1;
    default:
        void;
};
struct ddp_conn_type_res_v1_ok {
    dd_uint32_t rpc_version;
};
struct ddp_conn_type_res_fail {
    dd_err_t err;
    dd_uint32_t rpc_version;
};
union ddp_conn_type_res_v1 switch (nfsstat3 status) {
    case NFS3_OK:
        ddp_conn_type_res_v1_ok resok;
    default:
        ddp_conn_type_res_fail resfail;
};
union ddp_conn_type_res switch (ddp_rpc_version rpc_version) {
    case DDP_RPC_VERSION_1 :
        ddp_conn_type_res_v1 v1;
    default:
        void;
};
```

In an embodiment, the above RPC is sent during connection sequence immediately after an authentication sequence completes. In other embodiments, the client can choose to send the new RPC any time. Once the DDBoost server receives this RPC, it allocates resources for the server-initiated communication channel. Once the resources are successfully allocated, the DDBoost server responds back to the client. DDBoost client should be ready to receive RPCs from the DDBoost server at this point. This also means that the DDBoost client should first allocate its own resources before sending the above RPC to DDBoost server.

The DDBoost server can also choose to return a failure should there be cases where insufficient resources are available or any other error scenarios.

Figure 13:
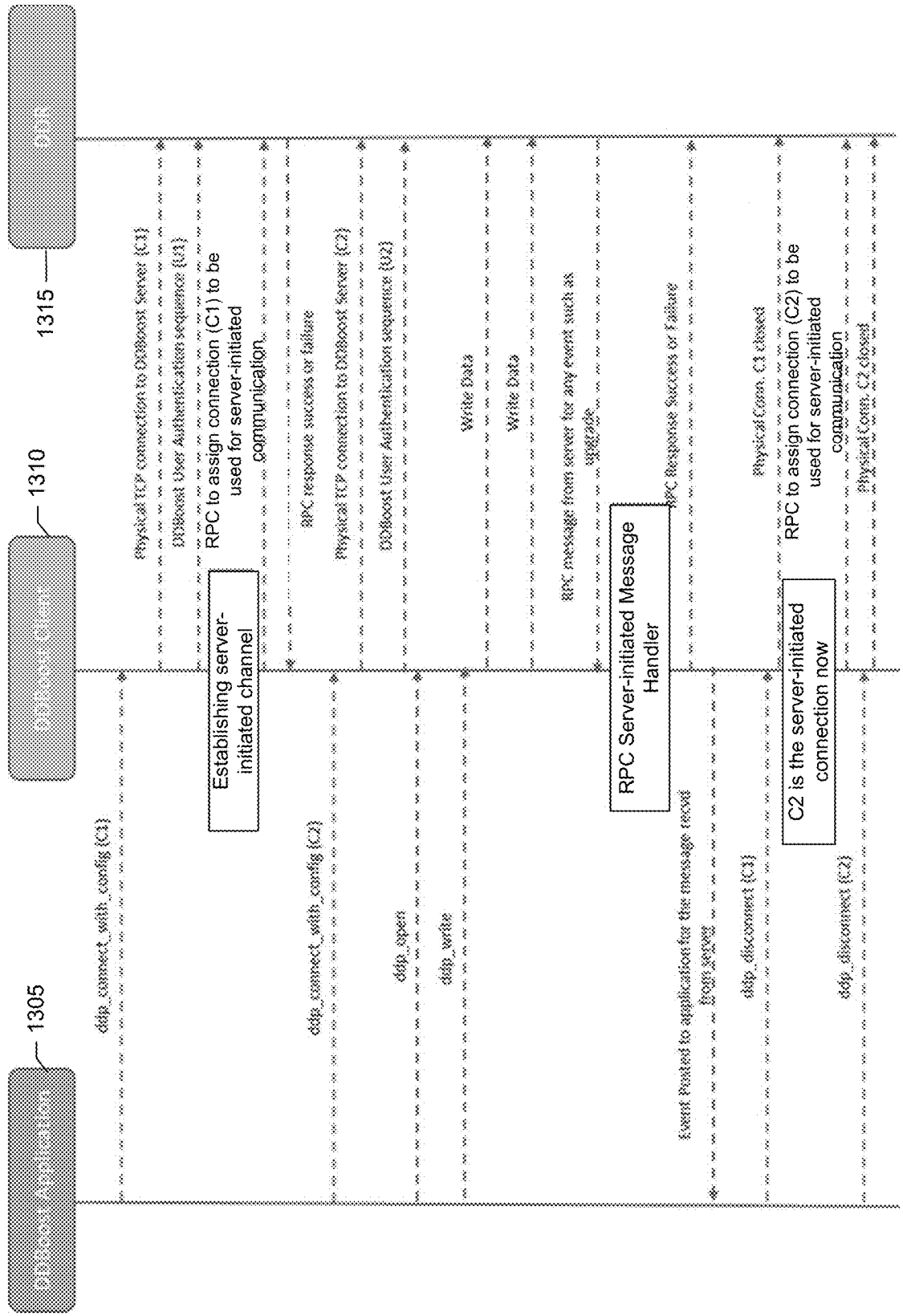
FIG. 13 shows a sequence diagram of a server-initiated communication connection, according to one or more embodiments.

FIG. 13 shows a sequence diagram for server-initiated communication channel connection and disconnection. The sequence of when a server-initiated communication connection is established and destroyed is shown in FIG. 13. The sequence diagram shown in FIG. 13 includes a DDBoost application 1305 (e.g., backup application), a DDBoost client 1310, and a DDR 1315. The DDBoost client manages which connection is used for a server-initiated communication channel connection with each DDBoost server it connects to. It may manage an array or pool of connections identifiers for all the connections to the DDBoost server. It adds an enum/flag to indicate the connection is also used for a server-initiated communication channel.

In case of a connection getting terminated and that connection was also marked for use as a server-initiated communication connection, it will review the established connection pool and find another connection that can now be used as a server-initiated communication connection as part of the termination sequence.

The DDBoost client sends a similar RPC message to indicate a new connection to be used for server-initiated channel messages. The DDBoost server does not need to perform any specific actions other than adding the same to the pool of connections it is managing and mark that connection where it should send the server-initiated communication channel messages. DDBoost client ensures that it always sends the same unique client ID for the connection sequence of the same client instance.

In an embodiment, systems and techniques provide for a server-initiated feature toggle. A feature toggle on the DDBoost server side allows for addressing any unforeseeable bug in a customer's environment. When such feature is toggled off, the DDBoost server can return an appropriate error for the RPC as described above.

In an embodiment, systems and techniques provide for multiple connection per client. In an embodiment, the DDBoost client makes multiple connections to the DDBoost server depending on the scenarios. The DDBoost client can use the above mechanism to also dedicate or assign multiple connections as a server-initiated connection. The DDBoost client can choose to make few connections shared for server-initiated communication channel events. This is decided based on the number of "different" users connecting to the server. This can also depend on encryption being used across various connections. The server-initiated communication connection inherits the properties of the original connection being made by an application.

In an embodiment, systems and techniques provide for an RPC transfer mechanism. There can be multiple approaches that can be implemented to send an RPC message from server to client as described in the following. In a first approach, the DDBoost server sends server-initiated message using an RPC or gRPC mechanism. The DDBoost server acts as a client to send out RPC message and the client includes service handlers defined to service the incoming RPC messages. The remaining processing is as shown in FIG. 12 and described in the discussion accompanying FIG. 12.

In a second approach, the client sends RPC messages on the server-side during initialization of connection and will not expect an immediate reply from the server. The server can respond to the messages and when it has a message/ event to send back to the client. The client then processes the reply as an incoming message by examining the "data" embedded in there. Once the processing is complete, it posts the new RPC message back to the DDBoost server along with the result of previously posted message. Both client and server can also embed message ID to determine the status.

Below are some uses cases of a server-initiated communication channel and discussion of corresponding callback RPCs Non-disruptive upgrades. When DD is undergoing an upgrade, the DDBoost server can send callback RPC message which instructs the DDBoost clients to either pause IOs or expect some wait duration since a DD upgrade is in progress.

Cache Refresh. DDBoost client caches multiple items for performance and optimization such as file handles and so forth. However, if something changed for a particular file or if the file is removed, directory level notification callback can be sent by the DDBoost server to notify clients to refresh its cache.

Managed File Replication (MFR) Status. The application uses ddp_filecopy_* APIs for MFR operations. Once it starts filecopy, they poll for the status. When an application is polling, DDBoost client each time sends RPC to DD to find out the status. This can be avoided by having a callback that tells about the filecopy status.

Status map. DD (AoB) nodes can let the DDBoost client know about the current map and status of nodes if any is going up/down, etc.

Delegation. Delegation is similar to allowing clients to cache a file so that clients with large caches can do unlimited read/write cache. Delegation needs revoking from server side to handle various scenarios. This requires an ability for server to send a callback message back to client.

Updates availability. DDBoost server can send out a callback message to DDBoost client whenever a new library is available for upgrades.

QoS. In an embodiment, the DDBoost client uses 'n' times connections to do parallel reads for encrypted restore workflow. However, this can start taking up significant networking resources on the server-side. DDBoost server can send callback messages to backoff or start throttling in case of resources on the server are getting consumed at a highwater mark level.

Idle file detection. DDFS can let the client know about idle files which are open for quite a long time but there is no further read/write activities happening. DDFS can ask clients to gracefully close those files Truly Dynamic Parameter changes on DDBoost client. There are certain parameters or variables that are tunable for the DDBoost client and they can be controlled via DDR. While changing the parameter on DDR can be sent back to DDBoost client or multiple clients via server-initiated communication channel without needing to wait for new connection or client side reboot. One use case is to control log levels. Another usecase can be to dump precert logs or FISL logs whenever something fails on the client.

In an embodiment, a method of load balancing on a client-side, as opposed to server side or via intermediate service, file operations across a cluster hosting a deduplicated file system comprises: storing at each of a plurality of namespace nodes in the cluster a load balancing algorithm and cluster configuration details; upon a client of a plurality of clients of the cluster connecting to a namespace node in the cluster, establishing a server-initiated communication channel to the client over which updates to the load balancing algorithm, cluster configuration details, or both are sent from the namespace node to the client; and sending, from the namespace node to the client, the load balancing algorithm and cluster configuration details, thereby allowing the client to determine, according to the load balancing algorithm and cluster configuration details, which particular namespace node should handle a particular file system operation.

The method may include: while the cluster is servicing file operations requested by the clients, receiving, at each of the plurality of namespace nodes, cluster change events detailing the updates to the load balancing algorithm, cluster configuration details, or both; and sending, from the namespace node to the client, the updates via the server-initiated channel.

The method may include: while the cluster is servicing file operations requested by the clients, receiving, at each of the plurality of namespace nodes, an updated load balancing algorithm; and sending, via the server-initiated channel, the updated load balancing algorithm from the namespace node to the client, wherein the client upon receipt of the updated load balancing algorithm replaces a previous load balancing algorithm with the updated load balancing algorithm.

The method may include: while the cluster is servicing file operations requested by the clients, receiving, at each of the plurality of namespace nodes, updated cluster configuration details; and sending, via the server-initiated channel, the updated cluster configuration details from the namespace node to the client, wherein the client upon receipt of the updated cluster configuration details replaces previous cluster configuration details with the cluster configuration details.

In an embodiment, the load balancing algorithm comprises a consistent hash algorithm and the cluster configuration details identify a number of namespace nodes in the cluster. In an embodiment, files in the deduplicated file system are represented by trees comprising multiple segment levels arranged in a hierarchy, wherein the namespace nodes are responsible for operations involving an upper-level of the trees, and deduplication nodes of the cluster are responsible for operations involving a lower-level of the trees.

In another embodiment, there is a system for load balancing file operations across a cluster hosting a deduplicated file system, the system comprising: a processor; and memory configured to store one or more sequences of instructions which, when executed by the processor, cause the processor to carry out the steps of: storing at each of a plurality of namespace nodes in the cluster a load balancing algorithm and cluster configuration details; upon a client of a plurality of clients of the cluster connecting to a namespace node in the cluster, establishing a server-initiated channel to the client over which updates to the load balancing algorithm, cluster configuration details, or both are sent from the namespace node to the client; and sending, from the namespace node to the client, the load balancing algorithm and cluster configuration details, thereby allowing the client to determine, according to the load balancing algorithm and cluster configuration details, which particular namespace node should handle a particular file system operation.

In another embodiment, there is a computer program product, comprising a non-transitory computer-readable medium having a computer-readable program code embodied therein, the computer-readable program code adapted to be executed by one or more processors to implement a method for load balancing file operations across a cluster hosting a deduplicated file system, the method comprising: storing at each of a plurality of namespace nodes in the cluster a load balancing algorithm and cluster configuration details; upon a client of a plurality of clients of the cluster connecting to a namespace node in the cluster, establishing a server-initiated channel to the client over which updates to the load balancing algorithm, cluster configuration details, or both are sent from the namespace node to the client; and sending, from the namespace node to the client, the load balancing algorithm and cluster configuration details, thereby allowing the client to determine, according to the load balancing algorithm and cluster configuration details, which particular namespace node should handle a particular file system operation.

In an embodiment, there is method of load balancing file operations across a cluster hosting a deduplicated file system comprising: storing at each of a plurality of front-end nodes in the cluster a load balancing algorithm and cluster configuration details; upon a client of a plurality of clients of the cluster connecting to a front-end node in the cluster, establishing a bi-directional communication between the client and the front-end node; sending, over the bi-directional communication, the load balancing algorithm and the cluster configuration details from the front-end node to the client, thereby allowing the client to determine, according to the load balancing algorithm and cluster configuration details, which front-end node should handle a particular file operation; while the cluster is servicing file operations requested by the clients, receiving, at each of the plurality of front-end nodes in the cluster, cluster change events detailing changes to one or more of the load balancing algorithm or the cluster configuration details; and sending, over the bi-directional communication, the cluster change events from the front-end node to the client.

Figure 14:
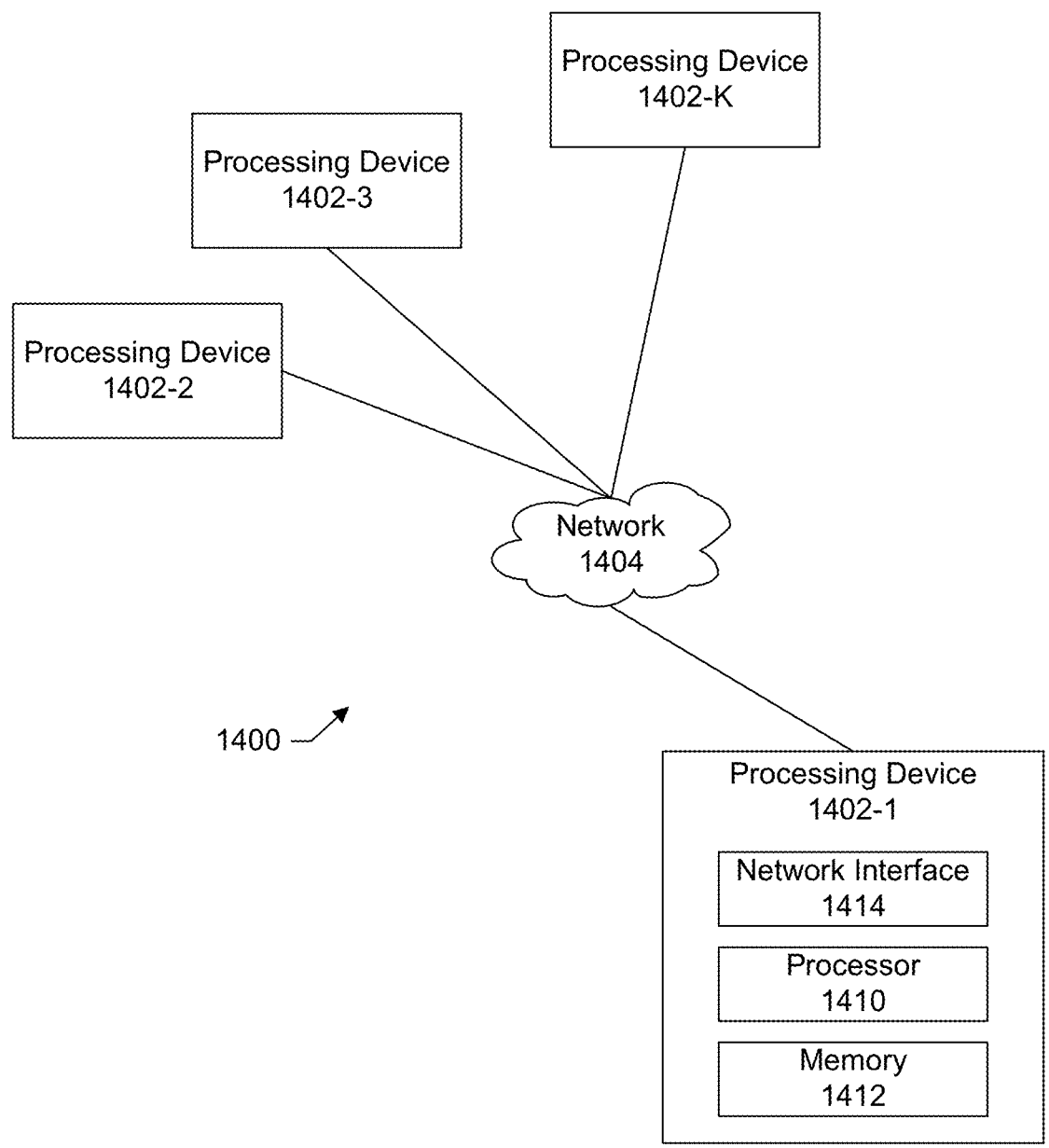
FIG. 14 shows a block diagram of a processing platform that may be utilized to implement at least a portion of an information processing system, according to one or more embodiments.

FIG. 14 shows an example of a processing platform 1400 that may include at least a portion of the information handling system shown in FIG. 1. The example shown in FIG. 14 includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 15:
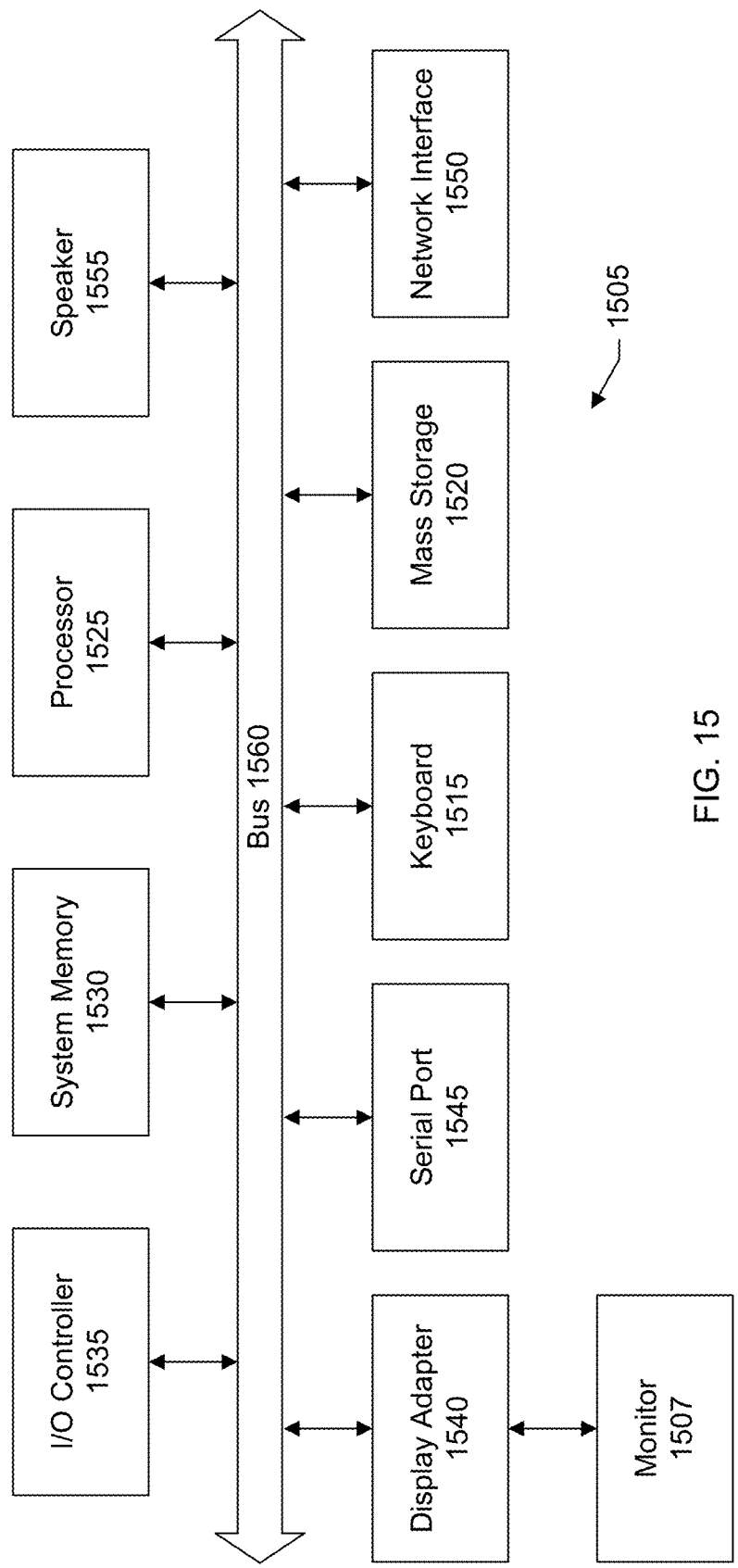
FIG. 15 shows a block diagram of a computer system suitable for use with the system, according to one or more embodiments.

FIG. 15 shows a system block diagram of a computer system 1505 used to execute the software of the present system described herein. The computer system includes a monitor 1507, keyboard 1515, and mass storage devices 1520. Computer system 1505 further includes subsystems such as central processor 1525, system memory 1530, input/output (I/O) controller 1535, display adapter 1540, serial or universal serial bus (USB) port 1545, network interface 1550, and speaker 1555. The system may also be used with computer systems with additional or fewer subsystems. For example, a computer system could include more than one processor 1525 (i.e., a multiprocessor system) or a system may include a cache memory.

Arrows such as 1560 represent the system bus architecture of computer system 1505. However, these arrows are illustrative of any interconnection scheme serving to link the subsystems. For example, speaker 1555 could be connected to the other subsystems through a port or have an internal direct connection to central processor 1525. The processor may include multiple processors or a multicore processor, which may permit parallel processing of information. Computer system 1505 shown in FIG. 15 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of load balancing, on a client-side, file operations across a cluster hosting a deduplicated file system comprising:

storing at each of a plurality of namespace nodes in the cluster a load balancing algorithm and cluster configuration details;

upon a client of a plurality of clients of the cluster connecting to a namespace node in the cluster, establishing a server-initiated communication channel to the client over which updates to the load balancing algorithm, cluster configuration details, or both are sent from the namespace node to the client;

sending, from the namespace node to the client, the load balancing algorithm and cluster configuration details, thereby allowing the client to determine, according to the load balancing algorithm and cluster configuration details, which particular namespace node should handle a particular file system operation;

while the cluster is servicing file operations requested by the clients, receiving, at each of the plurality of namespace nodes, an updated load balancing algorithm; and sending, via the server-initiated communication channel, the updated load balancing algorithm from the namespace node to the client, wherein the client upon receipt of the updated load balancing algorithm replaces a previous load balancing algorithm with the updated load balancing algorithm.

2. The method of claim 1 further comprising:

with each change that is made to the cluster, immediately sending an update detailing the change to each client that is connected to the cluster, thereby allowing each client to dynamically use, at runtime, the update to conduct the load balancing, wherein the change comprises one or more of an addition of a namespace node to the cluster, an addition of a service to the cluster, a removal of a namespace node from the cluster, a removal of a service from the cluster, or a software upgrade involving the cluster.

3. The method of claim 1 further comprising:

while the cluster is servicing file operations requested by the clients, receiving, at each of the plurality of namespace nodes, updated cluster configuration details; and sending, via the server-initiated communication channel, the updated cluster configuration details from the namespace node to the client, wherein the client upon receipt of the updated cluster configuration details replaces previous cluster configuration details with the updated cluster configuration details, and uses the updated cluster configuration details with the updated load balancing algorithm.

4. The method of claim 1 wherein the cluster configuration details identify a number of namespace nodes in the cluster.

5. The method of claim 1 wherein files in the deduplicated file system are represented by trees comprising multiple segment levels arranged in a hierarchy, wherein the namespace nodes are responsible for operations involving an upper-level of the trees, and deduplication nodes of the cluster are responsible for operations involving a lower-level of the trees.

6. A system for load balancing, on a client-side, file operations across a cluster hosting a deduplicated file system, the system comprising: a processor; and memory configured to store one or more sequences of instructions which, when executed by the processor, cause the processor to carry out the steps of:

storing at each of a plurality of namespace nodes in the cluster a load balancing algorithm and cluster configuration details;

upon a client of a plurality of clients of the cluster connecting to a namespace node in the cluster, establishing a server-initiated communication channel to the client over which updates to the load balancing algorithm, cluster configuration details, or both are sent from the namespace node to the client;

sending, from the namespace node to the client, the load balancing algorithm and cluster configuration details, thereby allowing the client to determine, according to the load balancing algorithm and cluster configuration details, which particular namespace node should handle a particular file system operation;

while the cluster is servicing file operations requested by the clients, receiving, at each of the plurality of namespace nodes, updated cluster configuration details; and sending, via the server-initiated communication channel, the updated cluster configuration details from the namespace node to the client, wherein the client upon receipt of the updated cluster configuration details replaces previous cluster configuration details with the updated cluster configuration details, and uses the updated cluster configuration details with the load balancing algorithm.

7. The system of claim 6 wherein the processor further carries out the steps of:

with each change that is made to the cluster, immediately sending an update detailing the change to each client that is connected to the cluster, thereby allowing each client to dynamically use, at runtime, the update to conduct the load balancing, wherein the change comprises one or more of an addition of a namespace node to the cluster, an addition of a service to the cluster, a removal of a namespace node from the cluster, a removal of a service from the cluster, or a software upgrade involving the cluster.

8. The system of claim 6 wherein the processor further carries out the steps of:

while the cluster is servicing file operations requested by the clients, receiving, at each of the plurality of namespace nodes, an updated load balancing algorithm; and sending, via the server-initiated communication channel, the updated load balancing algorithm from the namespace node to the client, wherein the client upon receipt of the updated load balancing algorithm replaces a previous load balancing algorithm with the updated load balancing algorithm.

9. The system of claim 6 wherein the cluster configuration details identify a number of namespace nodes in the cluster.

10. The system of claim 6 wherein files in the deduplicated file system are represented by trees comprising multiple segment levels arranged in a hierarchy, wherein the namespace nodes are responsible for operations involving an upper-level of the trees, and deduplication nodes of the cluster are responsible for operations involving a lower-level of the trees.

11. A computer program product, comprising a non-transitory computer-readable medium having a computer-readable program code embodied therein, the computer-readable program code adapted to be executed by one or more processors to implement a method for load balancing, on a client-side, file operations across a cluster hosting a deduplicated file system, the method comprising:

storing at each of a plurality of namespace nodes in the cluster a load balancing algorithm and cluster configuration details;

upon a client of a plurality of clients of the cluster connecting to a namespace node in the cluster, establishing a server-initiated communication channel to the client over which updates to the load balancing algorithm, cluster configuration details, or both are sent from the namespace node to the client; and sending, from the namespace node to the client, the load balancing algorithm and cluster configuration details, thereby allowing the client to determine, according to the load balancing algorithm and cluster configuration details, which particular namespace node should handle a particular file system operation, wherein files in the deduplicated file system are represented by trees comprising multiple segment levels arranged in a hierarchy, wherein the namespace nodes are responsible for operations involving an upper-level of the trees, and deduplication nodes of the cluster are responsible for operations involving a lower-level of the trees.

12. The computer program product of claim 11 wherein the method further comprises:

with each change that is made to the cluster, immediately sending an update detailing the change to each client that is connected to the cluster, thereby allowing each client to dynamically use, at runtime, the update to conduct the load balancing, wherein the change comprises one or more of an addition of a namespace node to the cluster, an addition of a service to the cluster, a removal of a namespace node from the cluster, a removal of a service from the cluster, or a software upgrade involving the cluster.

13. The computer program product of claim 11 wherein the method further comprises:

while the cluster is servicing file operations requested by the clients, receiving, at each of the plurality of namespace nodes, an updated load balancing algorithm; and sending, via the server-initiated communication channel, the updated load balancing algorithm from the namespace node to the client, wherein the client upon receipt of the updated load balancing algorithm replaces a previous load balancing algorithm with the updated load balancing algorithm.

14. The computer program product of claim 11 wherein the method further comprises:

while the cluster is servicing file operations requested by the clients, receiving, at each of the plurality of namespace nodes, updated cluster configuration details; and sending, via the server-initiated communication channel, the updated cluster configuration details from the namespace node to the client, wherein the client upon receipt of the updated cluster configuration details replaces previous cluster configuration details with the updated cluster configuration details, and uses the updated cluster configuration details with the load balancing algorithm.

15. The computer program product of claim 11 wherein the cluster configuration details identify a number of namespace nodes in the cluster.

* * * * *